US011522984B2

(12) United States Patent
Lim

(10) Patent No.: US 11,522,984 B2
(45) Date of Patent: Dec. 6, 2022

(54) HINGED ELECTRONIC DEVICE WITH DISPLACEMENT ALTERING HINGE AND CORRESPONDING SYSTEMS

(71) Applicant: Motorola Mobility LLC, Chicago, IL (US)

(72) Inventor: Yongho Lim, Kildeer, IL (US)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 16/953,251

(22) Filed: Nov. 19, 2020

(65) Prior Publication Data

US 2022/0159110 A1  May 19, 2022

(51) Int. Cl.
*H04M 1/02* (2006.01)

(52) U.S. Cl.
CPC ........ *H04M 1/0216* (2013.01); *H04M 1/0268* (2013.01)

(58) Field of Classification Search
CPC combination set(s) only.
See application file for complete search history.

(56) References Cited

U.S. PATENT DOCUMENTS

| 8,483,784 | B2 * | 7/2013 | Griffin | ................. | H04M 1/022 |
| | | | | | 455/90.3 |
| 10,601,967 | B1 | 3/2020 | Harmon et al. | | |
| 10,845,850 | B1 * | 11/2020 | Kang | ...................... | E05D 3/122 |
| 2015/0241925 | A1 | 8/2015 | Seo et al. | | |
| 2017/0139663 | A1 | 5/2017 | Ahn | | |
| 2017/0374749 | A1 | 12/2017 | Lee et al. | | |
| 2018/0242466 | A1 | 8/2018 | Lee et al. | | |
| 2018/0341295 | A1 | 11/2018 | Lan | | |
| 2020/0359514 | A1 | 11/2020 | Lin | | |
| 2020/0392983 | A1 | 12/2020 | Chang | | |
| 2021/0011513 | A1 | 1/2021 | Watamura et al. | | |

OTHER PUBLICATIONS

Perez, Angelica, "NonFinal Office Action", U.S. Appl. No. 17/018,932, filed Sep. 11, 2020; dated Sep. 23, 2021.
Lim, et al., "Application as Filed", U.S. Appl. No. 17/018,932, filed Sep. 11, 2020.
Moussa, AIT , "Introductions to Mechanisms and Kinematics", University of Central Oklahoma Dept of Engineering & Physics; Chapter 1 Lecture http://www.engineering.uco.edu/~aaitmoussa/Courses/ENGR3153/Lectures/Chapter1/chapter_1b.pdf; Unknown Publication Date but prior to filing of present application.
Perez, Angelica, "Final Office Action", U.S. Appl. No. 17/108,932, filed Sep. 11, 2020; dated Apr. 6, 2022.
Perez, Angelica M. , "Notice of Allowance", U.S. Appl. No. 17/018,932, filed Sep. 11, 2020; dated Aug. 19, 2022.

* cited by examiner

*Primary Examiner* — Lester G Kincaid
*Assistant Examiner* — Maryam Soltanzadeh
(74) *Attorney, Agent, or Firm* — Philip H. Burrus, IV

(57) ABSTRACT

An electronic device includes first device housing and a second device housing. The electronic device included a hinge housing with a hinge coupled to the first device housing and the second device housing such that the first device housing is pivotable about the hinge housing between an axially displaced open position and a closed position. The hinge of the hinge housing changes a displacement between the hinge housing and the first device housing and second device housing, respectively, when the first device housing and the second device housing pivot about the hinge housing between the axially displaced open position and the closed position.

20 Claims, 17 Drawing Sheets

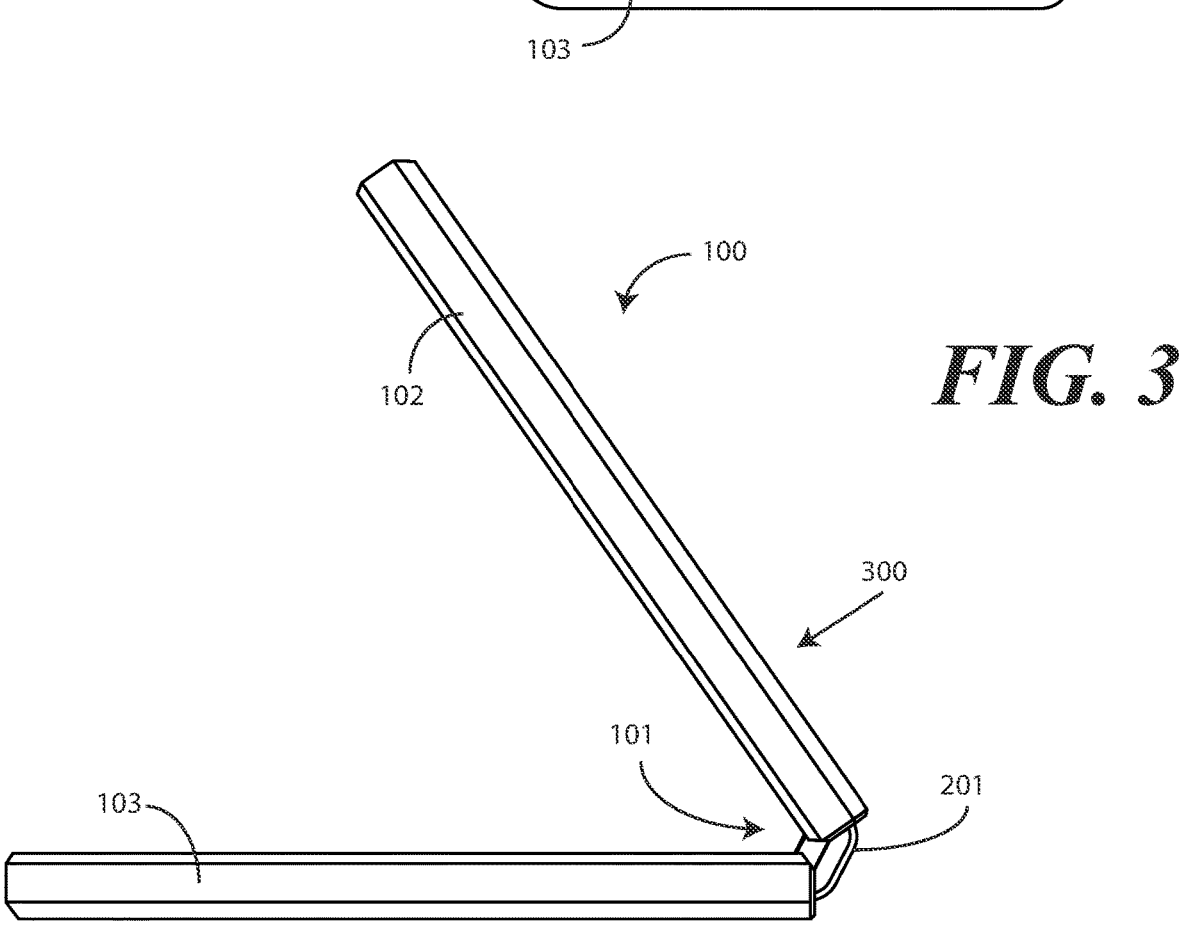

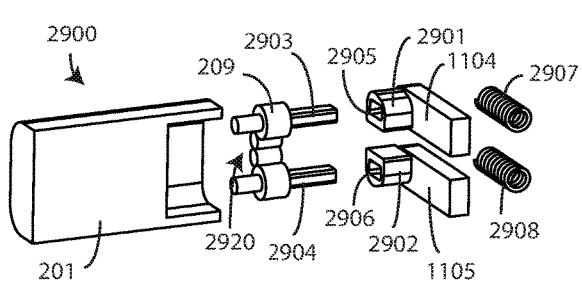
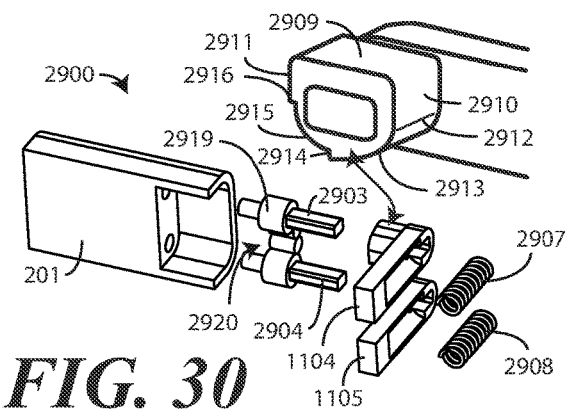
FIG. 29  FIG. 30
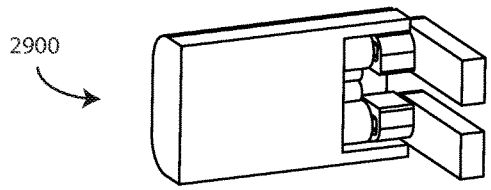
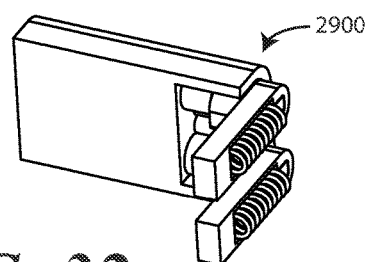
FIG. 31  FIG. 32
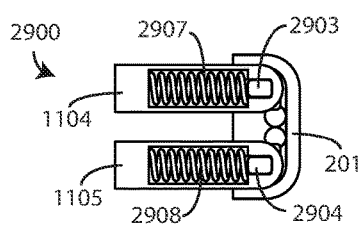 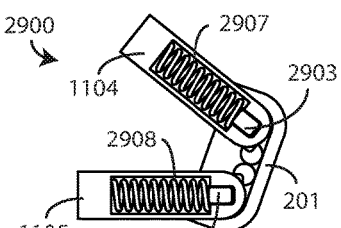 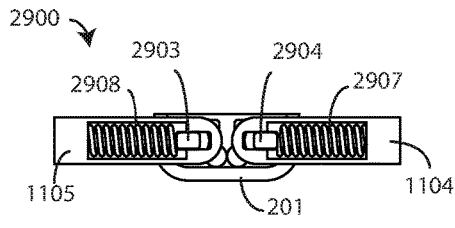
FIG. 33  FIG. 34  FIG. 35
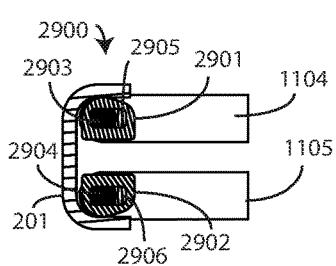 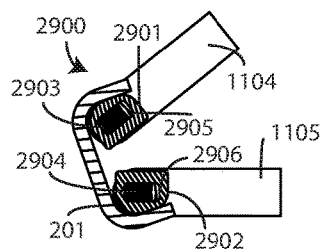 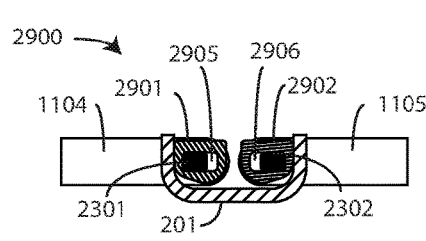
FIG. 36  FIG. 37  FIG. 38

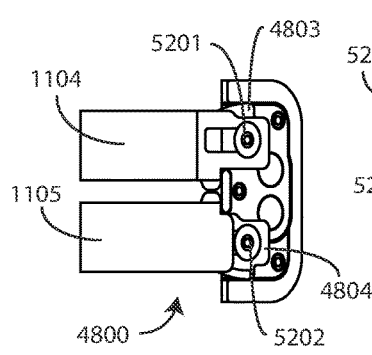
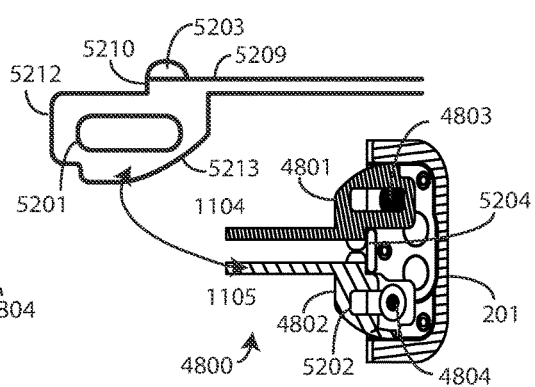
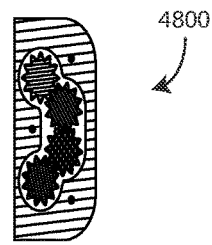
*FIG. 51*  *FIG. 52*  *FIG. 53*
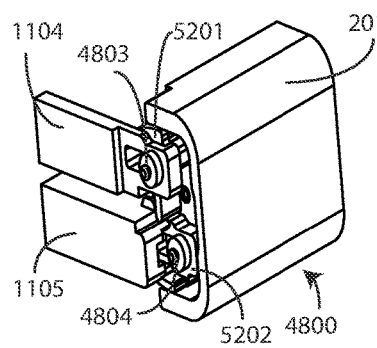
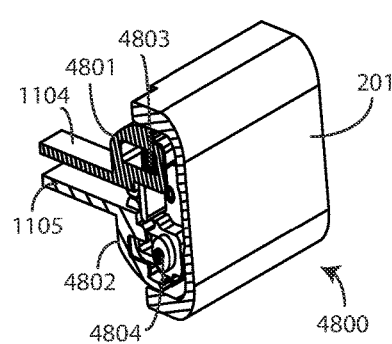
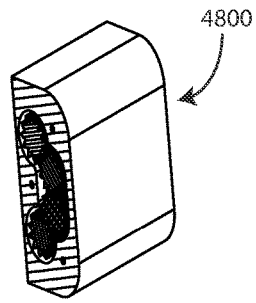
*FIG. 54*  *FIG. 55*  *FIG. 56*
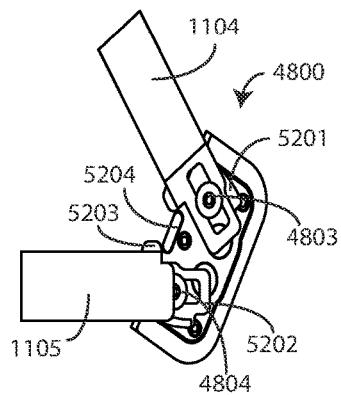
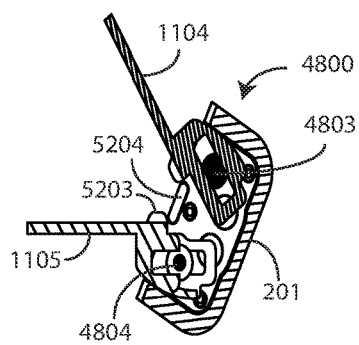
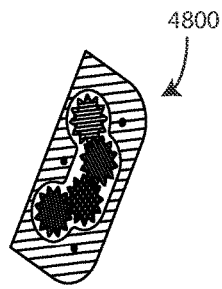
*FIG. 57*  *FIG. 58*  *FIG. 59*

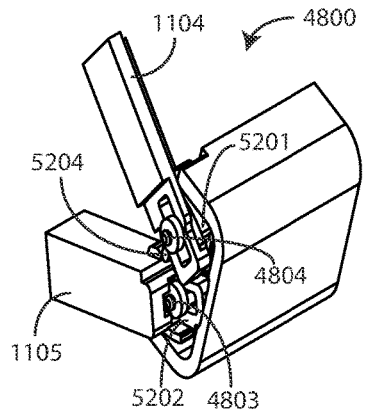 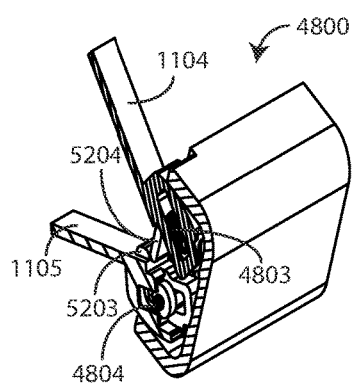 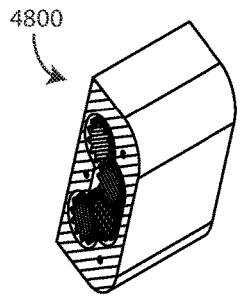
*FIG. 60*   *FIG. 61*   *FIG. 62*
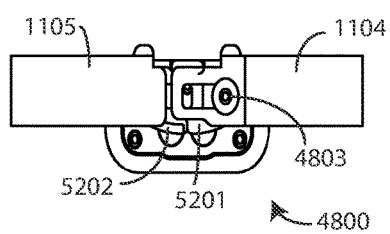 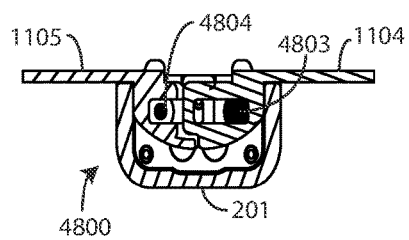 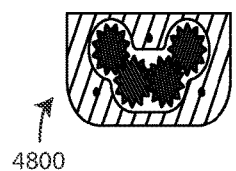
*FIG. 63*   *FIG. 64*   *FIG. 65*
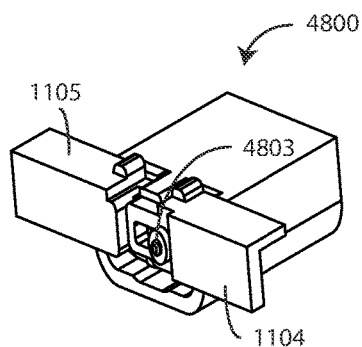 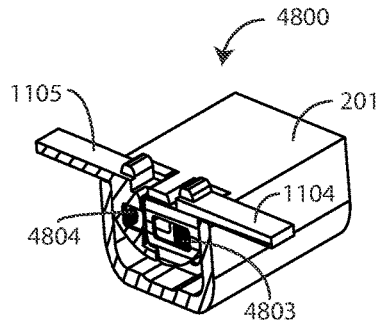 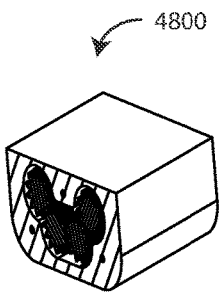
*FIG. 66*   *FIG. 67*   *FIG. 68*

HINGED ELECTRONIC DEVICE WITH DISPLACEMENT ALTERING HINGE AND CORRESPONDING SYSTEMS

BACKGROUND

Technical Field

This disclosure relates generally to electronic devices, and more particularly to hinged electronic devices.

Background Art

Portable electronic communication devices, especially smartphones, have become ubiquitous. People all over the world use such devices to stay connected. These devices have been designed in various mechanical configurations. A first configuration, known as a "candy bar," is generally rectangular in shape, has a rigid form factor, and has a display disposed along a major face of the electronic device. By contrast, a "clamshell" device has a mechanical hinge that allows one housing to pivot relative to the other.

Some consumers prefer candy bar devices, while others prefer clamshell devices. To satisfy the latter, it would thus be desirable to have an improved hinged electronic device.

BRIEF DESCRIPTION OF THE DRAWINGS

FIG. 2 illustrates a perspective view of one explanatory electronic device in accordance with one or more embodiments of the disclosure in a closed position.

FIG. 3 illustrates a side elevation view of one explanatory electronic device in accordance with one or more embodiments of the disclosure in a partially open position.

FIG. 29 illustrates an exploded view of another explanatory hinge configured in accordance with one or more embodiments of the disclosure.

FIG. 30 illustrates another exploded view of another explanatory hinge configured in accordance with one or more embodiments of the disclosure.

FIG. 31 illustrates an assembled view of another explanatory hinge configured in accordance with one or more embodiments of the disclosure.

FIG. 32 illustrates another assembled view of another explanatory hinge configured in accordance with one or more embodiments of the disclosure.

FIG. 32 illustrates a view of another explanatory hinge configured in accordance with one or more embodiments of the disclosure with the hinge in the closed position.

FIG. 33 illustrates the hinge of FIGS. 29-32 in the closed position.

FIG. 34 illustrates the hinge of FIGS. 29-32 in the partially open position.

FIG. 35 illustrates the hinge of FIGS. 29-32 in the axially displaced open position.

FIG. 36 illustrates a sectional view of the hinge of FIGS. 29-32 in the closed position.

FIG. 37 illustrates a sectional view of the hinge of FIGS. 29-32 in the partially open position.

FIG. 38 illustrates a sectional view of the hinge of FIGS. 29-32 in the axially displaced open position.

FIG. 51 illustrates the hinge of FIGS. 48-50 in the closed position.

FIG. 52 illustrates a sectional view of the hinge of FIG. 51.

FIG. 53 illustrates another sectional view of the hinge of FIG. 52.

FIG. 54 illustrates the hinge of FIGS. 48-50 in the closed position.

FIG. 55 illustrates a sectional view of the hinge of FIG. 54.

FIG. 56 illustrates another sectional view of the hinge of FIG. 54.

FIG. 57 illustrates the hinge of FIGS. 48-50 in the partially open position.

FIG. 58 illustrates a sectional view of the hinge of FIG. 57.

FIG. 59 illustrates another sectional view of the hinge of FIG. 57.

FIG. 60 illustrates the hinge of FIGS. 48-50 in the partially open position.

FIG. 61 illustrates a sectional view of the hinge of FIG. 60.

FIG. 62 illustrates another sectional view of the hinge of FIG. 60.

FIG. 63 illustrates the hinge of FIGS. 48-50 in the axially displaced open position.

FIG. 64 illustrates a sectional view of the hinge of FIG. 63.

FIG. 65 illustrates another sectional view of the hinge of FIG. 63.

FIG. 66 illustrates the hinge of FIGS. 48-50 in the axially displaced open position.

FIG. 67 illustrates a sectional view of the hinge of FIG. 66.

FIG. 68 illustrates another sectional view of the hinge of FIG. 66.

Figure 1:
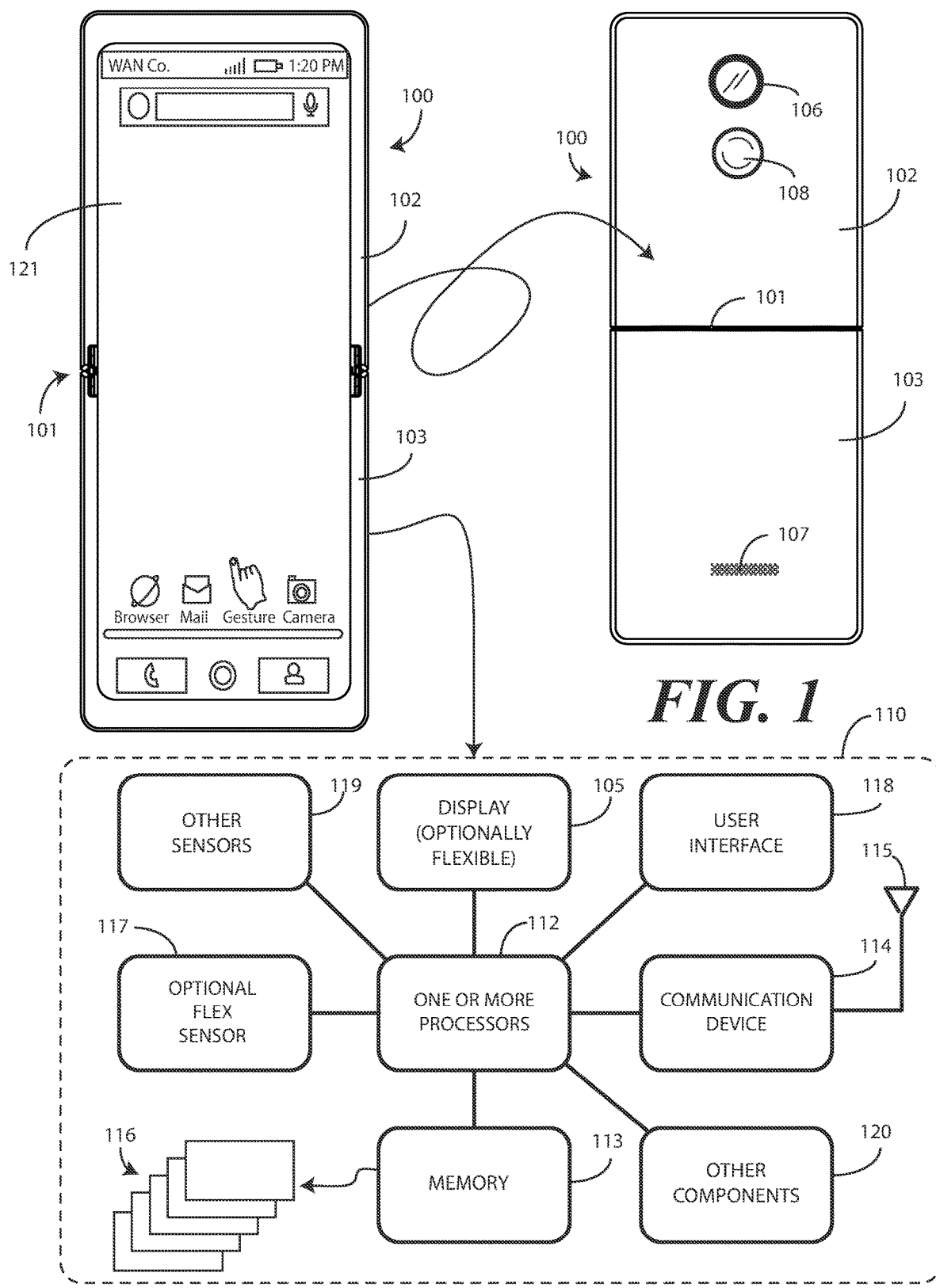
FIG. 1 illustrates one explanatory electronic device in accordance with one or more embodiments of the disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

DETAILED DESCRIPTION OF THE DRAWINGS

Embodiments of the disclosure are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on."

Relational terms such as first and second, top and bottom, and the like may be used solely to distinguish one entity or action from another entity or action without necessarily requiring or implying any actual such relationship or order between such entities or actions. As used herein, components may be "operatively coupled" when information can be sent between such components, even though there may be one or more intermediate or intervening components between, or along the connection path.

The terms "substantially", "essentially", "approximately", "about" or any other version thereof, are defined as being close to as understood by one of ordinary skill in the art, and in one non-limiting embodiment the term is defined to be within ten percent, in another embodiment within five percent, in another embodiment within one percent and in another embodiment within one-half percent. The term "coupled" as used herein is defined as connected, although not necessarily directly and not necessarily mechanically. Also, reference designators shown herein in parenthesis indicate components shown in a figure other than the one in discussion. For example, talking about a device (10) while discussing figure A would refer to an element, 10, shown in figure other than figure A.

Embodiments of the disclosure provide an electronic device that includes at least a first device housing and a second device housing. In one or more embodiments, a hinge couples the first device housing to the second device housing so that the first device housing is pivotable about the hinge relative to the second device housing to one or more of a bent configuration, a folded configuration, or other configuration.

In one or more embodiments, a flexible display is coupled to the first device housing and the second device housing and spans the hinge. The flexible display deforms when the first device housing pivots about the hinge relative to the second device housing. In other embodiments, the first device housing and the second device housing each have coupled thereto a separate display, which may be rigid or flexible. For example, a first display may be coupled to the first device housing on one side of the hinge, while a second display is coupled to the second device housing on a second side of the hinge.

In one or more embodiments, the hinge not only facilitates the bending operation, but also works to improve the reliability and usability of the flexible display. In one or more embodiments, the hinge does this via the use of one or more support plates that are coupled to a hinge housing and are pivotable relative to the hinge housing when the first device housing pivots about the hinge relative to the second device housing.

In one or more embodiments, a first support plate is pivotally coupled to a first side of the hinge housing. The first support plate then extends distally into the first device housing from the first side of the hinge housing. Similarly, a second support plate is pivotally coupled to a second side of the hinge housing. The second support plate extends distally into the second device housing from the second side of the hinge housing.

The hinge housing and its corresponding support plates serve two functions. First, they provide mechanical support for the flexible display when the first device housing has pivoted about the hinge relative to the second device housing to an axially displaced open position. However, when the first device housing pivots about the hinge relative to the second device housing to a closed position, in which interior surfaces of the first device housing and the second device housing abut, the support plates translate along inclined planes within the first device housing and second device housing, respectively, to recede into the first device housing and second device housing. Said differently, when the first device housing pivots about the hinge relative to the second device housing to the closed position, the support plates move toward the exterior surfaces of the first device housing and the second device housing, thereby receding "outward" from the interior surfaces of the first device housing and the second device housing. This "collapse" of the first support plate and the second support plate creates a cavity in the hinge portion of the electronic device that allows the flexible display to form a service loop when the electronic device is in the closed position. The service loop prevents the flexible display from being damaged or developing memory in the folded position when the electronic device is in the closed position.

Embodiments of the disclosure contemplate that bending operations occurring in a housing of an electronic device with a flexible display can present technical challenges. Illustrating by example, it can be difficult to provide uniform mechanical support beneath the flexible display when the electronic device is in the open position. It can further be difficult to limit deformation due to bending operations such that the deformation occurs within a predefined radius.

Advantageously, embodiments of the disclosure provide solutions to each one of these challenges. Specifically hinges configured in accordance with one or more embodiments of the disclosure provide a solution that provides the needed system flexibility by providing support for the flexible display when in the open position, but allows for a large radius service loop of the flexible display to occur when the electronic device is in the closed position.

In one or more embodiments, each of the first device housing and the second device housing defines a support plate receiving recess at the hinged portion of the electronic device. In one or more embodiments, these support plate receiving recesses each comprise an inclined plane, which is physically separated from the hinge housing of the hinge by a predefined distance. A distal end of each support plate contacts the inclined plane to translate along the inclined plane when the first device housing pivots about the hinge relative to the second device housing. Thus, if a first side of a first support plate is coupled to the hinge housing, a second, distal side of the first support plate contacts the inclined plane in the support plate receiving recess of the first device housing. The second, distal side of the first support plate then translates along the inclined plane when the first device housing pivots about the hinge relative to the second device housing. A second support plate and support plate receiving recess can be similarly configured in the second device housing.

The distal ends of each of the first support plate and the second support plate therefore travel, in one or more embodiments, along their respective inclined planes between a first position within the first device housing and the second device housing, respectively, to a second position within the first device housing and the second device housing, respectively, when the first device housing and the second device housing pivot about the hinge from an axially displaced open position to a closed position. In one or more embodiments, the support plates are closer to the flexible display when in the first position and are farther from the flexible display when in the second position. In one or more embodiments, the support plates are farther from exterior surfaces of the first device housing and the second device housing when in the first position but are closer to those outer surfaces of the first device housing and the second device housing when in the second position. This results in the second position being deeper within the first device housing and the second device housing, respectively, than the first position.

In one or more embodiments, the flexible display is positioned within a linear recess of the first device housing and the second device housing so that it—or a fascia disposed atop the flexible display—can be flush with the interior surfaces of the first device housing and second device housing, respectively. In other embodiments, the linear recess will be omitted, and the flexible display will simply sit atop planar interior surfaces of the first device housing and the second device housing. In either embodiment, when the first device housing pivots about the hinge relative to the second device housing to the axially displaced, open position, the first support plate, the hinge housing, and the second support plate bridge the linear recess (or planar interior surfaces) to provide mechanical support for the flexible display. By contrast, by receding into the housings, the first support plate, the hinge housing, and the second support plate define boundaries within which the flexible display defines a service loop when the first device housing and the second device housing pivot about the hinge from the axially displaced open position to a closed position.

Embodiments of the disclosure thus provide a novel hinge mechanism that properly supports a flexible display when a hinged electronic device is in the open position. Embodiments of the disclosure contemplate that the mechanical stack of the flexible display is frequently too soft or flexible to support itself. Accordingly, when the electronic device is in the axially displaced open position the support plates provide rigid support across the hinge portion of the electronic device. At the same time, the support plates receded into the housing when the electronic device is folded to allow the flexible display to form a service loop. Advantageously, the hinge housing and corresponding support plates define kinematic linkages that move when the first device housing pivots about the hinge relative to the second device housing to the closed position. As noted above, the support plates recede backwards (along the Z-axis) to provide space for the flexible display to bend into a teardrop shaped service loop.

Embodiments of the disclosure contemplate that when the flexible display is fixedly coupled to the first device housing and also fixedly coupled to the second device housing, with the first device housing, hinge, and second device housing configured to cause the flexible display to extend and become substantially planar when the first device housing and second device housing are in the axially displaced open position, the path length of the mechanical mechanism defined by the first support plate, the second support plate, and the hinge housing can be different than the path length of the flexible display when each is in the closed position. Said differently, for an electronic device configured to extend a flexible display flat when in the axially displaced open position, when the electronic device is in the closed position, the length of the service loop defined by the flexible display and the mechanical boundaries defined by the first support plate, hinge housing, and second support plate may be different. In particular, to provide sufficient room for the service loop, the mechanical mechanism defined by the first support plate, the hinge housing, and the second support plate may be longer than the length of display that bends to define the service loop. This difference in length can be problematic in that it can result in either deformations in the service loop when the electronic device is in the closed position, or alternatively mechanical strain or unevenness in the flexible display when the electronic device is in the axially displaced open position.

While a spring-loaded plate can be used to apply tension to one end of the flexible display to compensate for the distance differential, experimental testing has shown that this can cause the flexible display to "feel" like its moving when a user is delivering user input to the flexible display. Advantageously, embodiments of the disclosure provide an improved hinge mechanism that eliminates the need for any spring-loaded plate. Hinges configured in accordance with embodiments of the disclosure allow for the flexible display to be fixedly connected to the first device housing and second device housing, respectively, and to fully extend when the electronic device is in the axially displaced open position, yet form a proper service loop when the electronic device is in the closed position.

Embodiments of the disclosure accomplish this by employing a hinge mechanism that changes a displacement between a hinge housing and the first device housing and second device housing, respectively, as the first device housing and second device housing pivot about the hinge housing between the axially displaced open position and the closed position. Effectively, hinges configured in accordance with embodiments of the disclosure cause the hinge housing to get closer to the first device housing and second device housing, respectively, when the electronic device is in the axially displaced open position, and farther from the hinge housing when the electronic device is in the closed position. This changing distance compensates for the difference between the bending length of the flexible display and the length of the mechanical mechanism supporting the flexible display.

In one or more embodiments, a hinge housing is coupled to a first hinge arm and a second hinge arm. In one or more embodiments, the first hinge arm is coupled to a first device housing, while the second hinge arm is coupled to a second device housing. This allows the first device housing to be pivotable about the hinge between and axially displaced open position and a closed position.

In one or more embodiments, the hinge housing comprises a first pin translating within a first slot of the first hinge arm and a second pin translating within a second slot of the second hinge arm, respectively, when the first device housing and the second device housing pivot about the hinge housing between the axially displaced open position and the closed position. This translation of the first pin within the first slot and the second pin within the second slot while the hinge pivots changes a displacement between the hinge housing and the first device housing and the second device housing. In one or more embodiments, this allows an interior face of the hinge housing to be positioned farther from the first device housing and the second device housing, respectively, when the first device housing is pivoted about the hinge housing relative to the second device housing to the closed position than when the first device housing is pivoted about the hinge housing relative to the second device housing to the axially displaced open position.

In one or more other embodiments, an electronic device also comprises a first device housing and a second device housing. A hinge housing is coupled to a first hinge arm, with the first hinge arm being coupled to the first device housing. Similarly, the hinge housing is coupled to a second hinge arm, with the second hinge arm being coupled to the second device housing. This allows the first device housing to be pivotable about the hinge housing relative to the second device housing between an axially displaced open position and a closed position.

In one or more embodiments, the hinge housing comprises a first post translating within a first aperture of a first cam. In one or more embodiments, the hinge housing also comprises a second post translating within an aperture of a second cam. These translations occur when the first device housing and the second device housing pivot about the hinge housing between the axially displaced open position and the closed position. In one or more embodiments, these translations change a displacement between the hinge housing and the second device housing.

In still other embodiments, the hinge housing is again coupled to a first hinge arm, which is coupled to a first device housing, and a second hinge arm, which is coupled to a second device housing, thereby allowing the first device housing to be pivotable about the hinge housing relative to the second device housing between an axially displaced open position and a closed position. In one or more embodiments, the hinge housing comprises a first post and a second post that is rotationally linked to the first post.

In one or more embodiments, the first post translates within a first aperture of a first cam, while the second post translates within a second aperture of a second cam, respectively, when the first device housing and the second device housing pivot about the hinge housing between the axially displaced open position and the closed position. In one or more embodiments, this translation again changes the displacement between the hinge housing and the first device housing and the second device housing.

Regardless of which hinge configuration is used, in one or more embodiments the change in displacement between the first device housing and the hinge housing, and the second device housing and the hinge housing occurs when the first device housing and second device housing rotate relative to teach other. Effectively, the first device housing and second device housing get closer to the hinge housing when the electronic device is in the axially displaced open position and get farther away from the hinge housing when the electronic device is in the closed position. This will be shown in more detail in the figures below.

This change in displacement advantageously compensates for the distance in the bending length of the flexible display and the length of the mechanical support. This also eliminates the need for any spring-loaded plate or other tensioning mechanism to be included. Moreover, it allows ends of the flexible display to be fixedly coupled to the first device housing and second device housing, respectively, thereby providing a more rigid and stable feel for users interacting with the flexible display using touch input. Other advantages of embodiments of the disclosure will be explained below. Still others will be obvious to those of ordinary skill in the art having the benefit of this disclosure.

Turning now to FIG. 1, illustrated therein is one explanatory electronic device 100 configured in accordance with one or more embodiments of the disclosure. The electronic device 100 of FIG. 1 is a portable electronic device. For illustrative purposes, the electronic device 100 is shown as a smartphone. However, the electronic device 100 could be any number of other devices as well, including tablet computers, gaming devices, multimedia players, and so forth. Still other types of electronic devices can be configured in accordance with one or more embodiments of the disclosure as will be readily appreciated by those of ordinary skill in the art having the benefit of this disclosure.

The electronic device 100 includes a first device housing 102 and a second device housing 103. In one or more embodiments, a hinge 101 couples the first device housing 102 to the second device housing 103. In one or more embodiments, the first device housing 102 is selectively pivotable about the hinge 101 relative to the second device housing 103. For example, in one or more embodiments the first device housing 102 is selectively pivotable about the hinge 101 between a closed position, shown and described below with reference to FIG. 2, and an axially displaced open position, shown and described below with reference to FIGS. 4-5.

In one or more embodiments the first device housing 102 and the second device housing 103 are manufactured from a rigid material such as a rigid thermoplastic, metal, or composite material, although other materials can be used. Still other constructs will be obvious to those of ordinary skill in the art having the benefit of this disclosure. In the illustrative embodiment of FIG. 1, the electronic device 100 includes a single hinge. However, in other embodiments two or more hinges can be incorporated into the electronic device 100 to allow it to be folded in multiple locations.

This illustrative electronic device 100 of FIG. 1 includes a display 105. The display 105 can optionally be touch-sensitive. In one embodiment where the display 105 is touch-sensitive, the display 105 can serve as a primary user interface 118 of the electronic device 100. Users can deliver user input to the display 105 of such an embodiment by delivering touch input from a finger, stylus, or other objects disposed proximately with the display 105.

In one embodiment, the display 105 is configured as an organic light emitting diode (OLED) display fabricated on a flexible plastic substrate, thereby making the display 105 a flexible display 121. This allows the display 105 to be flexible so as to deform when the first device housing 102 pivots about the hinge 101 relative to the second device housing 103. However, it should be noted that other types of displays suitable for use with the electronic device 100 will be obvious to those of ordinary skill in the art having the benefit of this disclosure. Illustrating by example, as will be described in more detail with reference to FIG. 69 below, in other embodiments multiple displays can be used. For instance, a first rigid display can be coupled to the first device housing 102, while a second, separate rigid display can be coupled to the second device housing 103, with the hinge 101 separating the two displays.

Where a flexible display 121 is used, in one or more embodiments an OLED is constructed on flexible plastic substrates can allow the flexible display 121 to bend with various bending radii. For example, some embodiments allow bending radii of between thirty and six hundred millimeters. Other substrates allow bending radii of around five millimeters to provide a display that is foldable through active bending.

In one or more embodiments the flexible display 121 may be formed from multiple layers of flexible material such as flexible sheets of polymer or other materials. In this illustrative embodiment, the flexible display 121 is fixedly coupled to the first device housing 102 and the second device housing 103. The flexible display 121 spans the hinge 101 in this illustrative embodiment.

Features can be incorporated into the first device housing 102 and/or the second device housing 103. Examples of such features include a camera 106 or an optional speaker port 107, which are shown disposed on the rear side of the electronic device 100 in this embodiment but could be placed on the front side as well. In this illustrative embodiment, a user interface component 108, which may be a button or touch sensitive surface, can also be disposed along the rear side of the first device housing 102. As noted, any of these features are shown being disposed on the rear side of the electronic device 100 in this embodiment, but could be located elsewhere, such as on the front side in other embodiments. In other embodiments, these features may be omitted.

A block diagram schematic 110 of the electronic device 100 is also shown in FIG. 1. The block diagram schematic 110 can be configured as a printed circuit board assembly disposed within either or both of the first device housing 102 or the second device housing 103 of the electronic device 100. Various components can be electrically coupled together by conductors or a bus disposed along one or more printed circuit boards. For example, some components of the block diagram schematic 110 can be configured as a first electronic circuit fixedly situated within the first device housing 102, while other components of the block diagram schematic 110 can be configured as a second electronic circuit fixedly situated within the second device housing 103. As will be described in more detail below, a flexible substrate can then span the hinge 101 to electrically couple the first electronic circuit to the second electronic circuit.

In one or more embodiments, the electronic device 100 includes one or more processors 112. In one embodiment, the one or more processors 112 can include an application processor and, optionally, one or more auxiliary processors. One or both of the application processor or the auxiliary processor(s) can include one or more processors. One or both of the application processor or the auxiliary processor(s) can be a microprocessor, a group of processing components, one or more ASICs, programmable logic, or other type of processing device.

The application processor and the auxiliary processor(s) can be operable with the various components of the electronic device 100. Each of the application processor and the auxiliary processor(s) can be configured to process and execute executable software code to perform the various functions of the electronic device 100. A storage device, such as memory 113, can optionally store the executable software code used by the one or more processors 112 during operation.

In this illustrative embodiment, the electronic device 100 also includes a communication circuit 114 that can be configured for wired or wireless communication with one or more other devices or networks. The networks can include a wide area network, a local area network, and/or personal area network. The communication circuit 114 may also utilize wireless technology for communication, such as, but are not limited to, peer-to-peer or ad hoc communications such as HomeRF, Bluetooth and IEEE 802.11, and other forms of wireless communication such as infrared technology. The communication circuit 114 can include wireless communication circuitry, one of a receiver, a transmitter, or transceiver, and one or more antennas 115.

In one embodiment, the one or more processors 112 can be responsible for performing the primary functions of the electronic device 100. For example, in one embodiment the one or more processors 112 comprise one or more circuits operable with one or more user interface devices, which can include the display 105, to present, images, video, or other presentation information to a user. The executable software code used by the one or more processors 112 can be configured as one or more modules 116 that are operable with the one or more processors 112. Such modules 116 can store instructions, control algorithms, logic steps, and so forth.

In one embodiment, the one or more processors 112 are responsible for running the operating system environment of the electronic device 100. The operating system environment can include a kernel and one or more drivers, and an application service layer, and an application layer. The operating system environment can be configured as executable code operating on one or more processors or control circuits of the electronic device 100. The application layer can be responsible for executing application service modules. The application service modules may support one or more applications or "apps." The applications of the application layer can be configured as clients of the application service layer to communicate with services through application program interfaces (APIs), messages, events, or other inter-process communication interfaces. Where auxiliary processors are used, they can be used to execute input/output functions, actuate user feedback devices, and so forth.

In one embodiment, the electronic device 100 optionally includes one or more flex sensors 117, operable with the one or more processors 112, to detect a bending operation that causes the first device housing 102 to pivot about the hinge 101 relative to the second device housing 103, thereby transforming the electronic device 100 into a deformed geometry, such as that shown in FIGS. 2-3. The inclusion of flex sensors 117 is optional, and in some embodiment flex sensors 117 will not be included.

In one embodiment, the one or more processors 112 may generate commands or execute control operations based on information received from the various sensors, including the one or more flex sensors 117, the user interface 118, or the other sensors 119. The one or more processors 112 may also generate commands or execute control operations based upon information received from a combination of the one or more flex sensors 117, the user interface 118, or the other sensors 119. Alternatively, the one or more processors 112 can generate commands or execute control operations based upon information received from the one or more flex sensors 117 or the user interface 118 alone. Moreover, the one or more processors 112 may process the received information alone or in combination with other data, such as the information stored in the memory 113.

The one or more other sensors 119 may include a microphone, an earpiece speaker, a second loudspeaker (disposed beneath speaker port 107), and a user interface component such as a button or touch-sensitive surface. The one or more other sensors 119 may also include key selection sensors, proximity sensors, a touch pad sensor, a touch screen sensor, a capacitive touch sensor, and one or more switches. Touch sensors may used to indicate whether any of the user actuation targets present on the display 105 are being actuated. Alternatively, touch sensors disposed in the electronic device 100 can be used to determine whether the electronic device 100 is being touched at side edges or major faces of the first device housing 102 or the second device housing 103. The touch sensors can include surface and/or housing capacitive sensors in one embodiment. The other sensors 119 can also include audio sensors and video sensors (such as a camera).

The other sensors 119 can also include motion detectors, such as one or more accelerometers or gyroscopes. For example, an accelerometer may be embedded in the electronic circuitry of the electronic device 100 to show vertical orientation, constant tilt and/or whether the electronic device 100 is stationary. The measurement of tilt relative to gravity is referred to as "static acceleration," while the measurement of motion and/or vibration is referred to as "dynamic acceleration." A gyroscope can be used in a similar fashion.

Other components 120 operable with the one or more processors 112 can include output components such as video outputs, audio outputs, and/or mechanical outputs. Examples of output components include audio outputs such as speaker port 107, earpiece speaker, or other alarms and/or buzzers and/or a mechanical output component such as vibrating or motion-based mechanisms. Still other components will be obvious to those of ordinary skill in the art having the benefit of this disclosure.

It is to be understood that FIG. 1 is provided for illustrative purposes only and for illustrating components of one electronic device 100 in accordance with embodiments of the disclosure and is not intended to be a complete schematic diagram of the various components required for an electronic device. Therefore, other electronic devices in accordance with embodiments of the disclosure may include various other components not shown in FIG. 1 or may include a combination of two or more components or a division of a particular component into two or more separate components, and still be within the scope of the present disclosure. Illustrating by example, the electronic device 100 of FIG. 1 includes a single flexible display 105. By contrast, another embodiment shown below in FIG. 36 includes two separate and distinct displays, and so forth. Additionally, as will be described in more detail below, some embodiments include support plates that are pivotally coupled to a hinge housing of the hinge 101. In other embodiments, these support plates will be omitted.

Turning now to FIG. 2, illustrated therein is the electronic device 100 in a closed state. In this state, the first device housing 102 has been pivoted about the hinge 101 toward the second device housing 103 to a closed position 200. When in the closed position 200, a front surface 202 of the first device housing 102 abuts a front surface 203 of the second device housing 103. Additionally, in this illustrative embodiment, a hinge housing 201 comprising the hinge 101 is revealed when the electronic device 100 is in the closed position 200. In other embodiments, the hinge housing 201 will remain concealed when the first device housing 102 pivots about the hinge 101 relative to the second device housing 103 to the closed position 200. Effectively, in either embodiment, the first device housing 102 and the second device housing 103 are analogous to clam shells that have been shut by the claim, thereby giving rise to the "clamshell" style of device. When the clamshell opens, the flexible display (121) is revealed.

In some embodiments, features can be included to further retain the electronic device 100 in the closed position 200. Illustrating by example, in another embodiment, a mechanical latch can be included to retain the first device housing 102 and the second device housing 103 in the closed position 200.

In still another embodiment, magnets can be incorporated into the front surface 202 of the first device housing 102 and the front surface 203 of the second device housing 103. For instance, magnets can be placed in the first device housing 102 and the second device housing 103 to retain the first device housing 102 and the second device housing 103 in the closed position 200.

In still other embodiments, frictional elements can be incorporated into the hinge 101 to retain the first device housing 102 and the second device housing 103 in a particular position. A stator motor could be integrated into the hinge 101 as well. Still other mechanical structures and devices suitable for retaining the electronic device 100 in the closed position 200 will be obvious to those of ordinary skill in the art having the benefit of this disclosure. As will be described below, in other embodiments retention devices can be omitted due to the fact that torsion springs used in combination with a cam having mechanical detents and a stator with mechanical protrusions are used.

Turning now to FIG. 3, the electronic device 100 is shown being transitioned from the closed position (200) of FIG. 2 to a partially open position 300. Specifically, the first device housing 102 is pivoting about the hinge 101 away from the second device housing 103 toward an open position. The open position 300 shown in FIG. 3 is a "tent position." In the side elevation view of FIG. 3, the hinge housing 201 is exposed between the first device housing 102 and the second device housing 103.

Figures 4, 5:
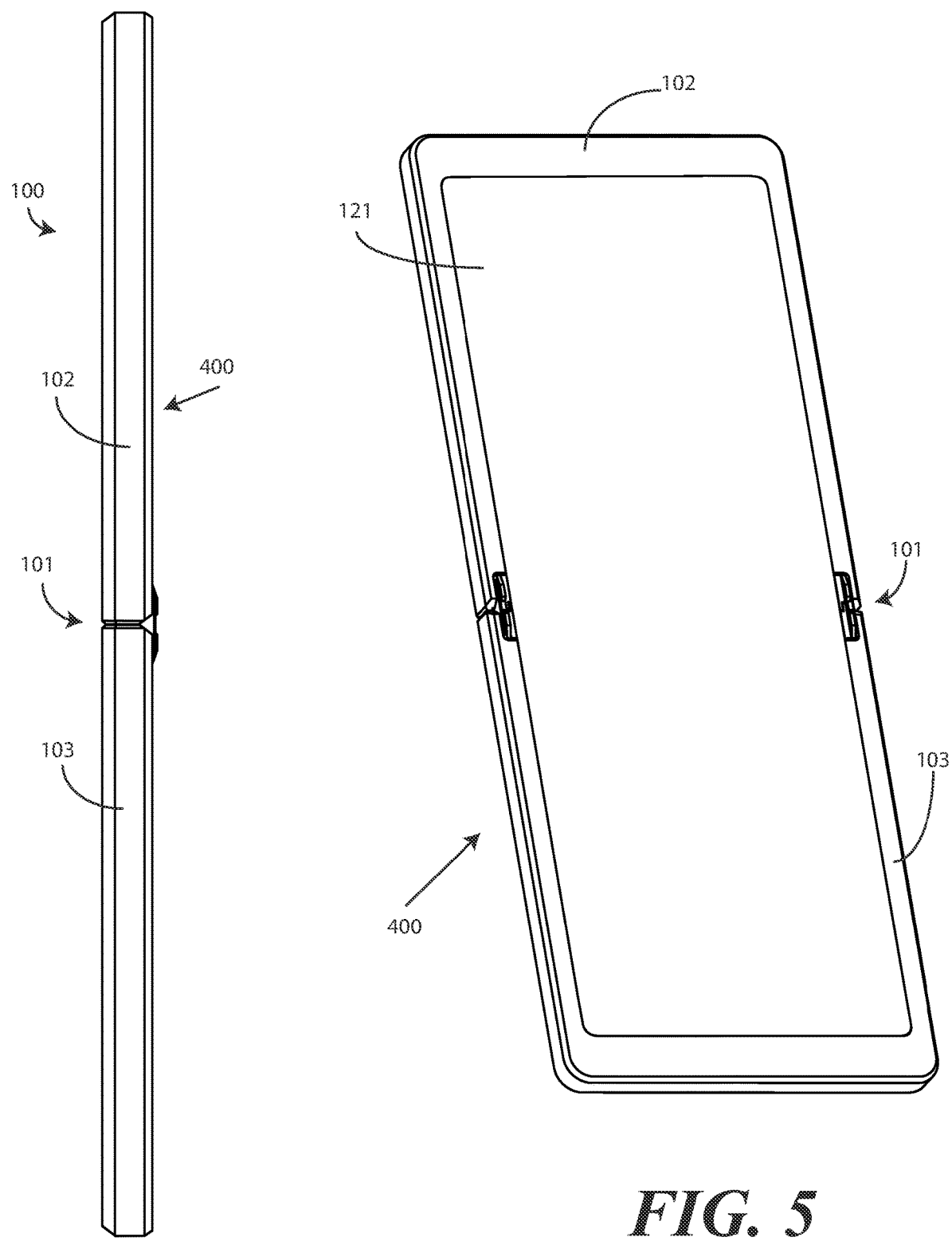
FIG. 4 illustrates a side elevation view of one explanatory electronic device in accordance with one or more embodiments of the disclosure in an axially displaced open position.
FIG. 5 illustrates a perspective view of one explanatory electronic device in accordance with one or more embodiments of the disclosure in the axially displaced open position.

Turning now to FIGS. 4 and 5, illustrated therein is the electronic device 100 in an axially displaced open position 400. In the axially displaced open position 400, the first device housing 102 is rotated about the hinge 101 so as to be axially displaced 180-degrees out of phase with the second device housing 103, thereby revealing the flexible display 121 of this embodiment. In this illustrative embodiment, this causes the hinge housing (201) to be concealed within the first device housing 102 and second device housing 103.

In such a configuration, the first device housing 102 and the second device housing 103 effectively define a plane. Since this illustrative embodiment includes a flexible display 121, the flexible display 121 has been elongated into a flat position.

Figure 6:
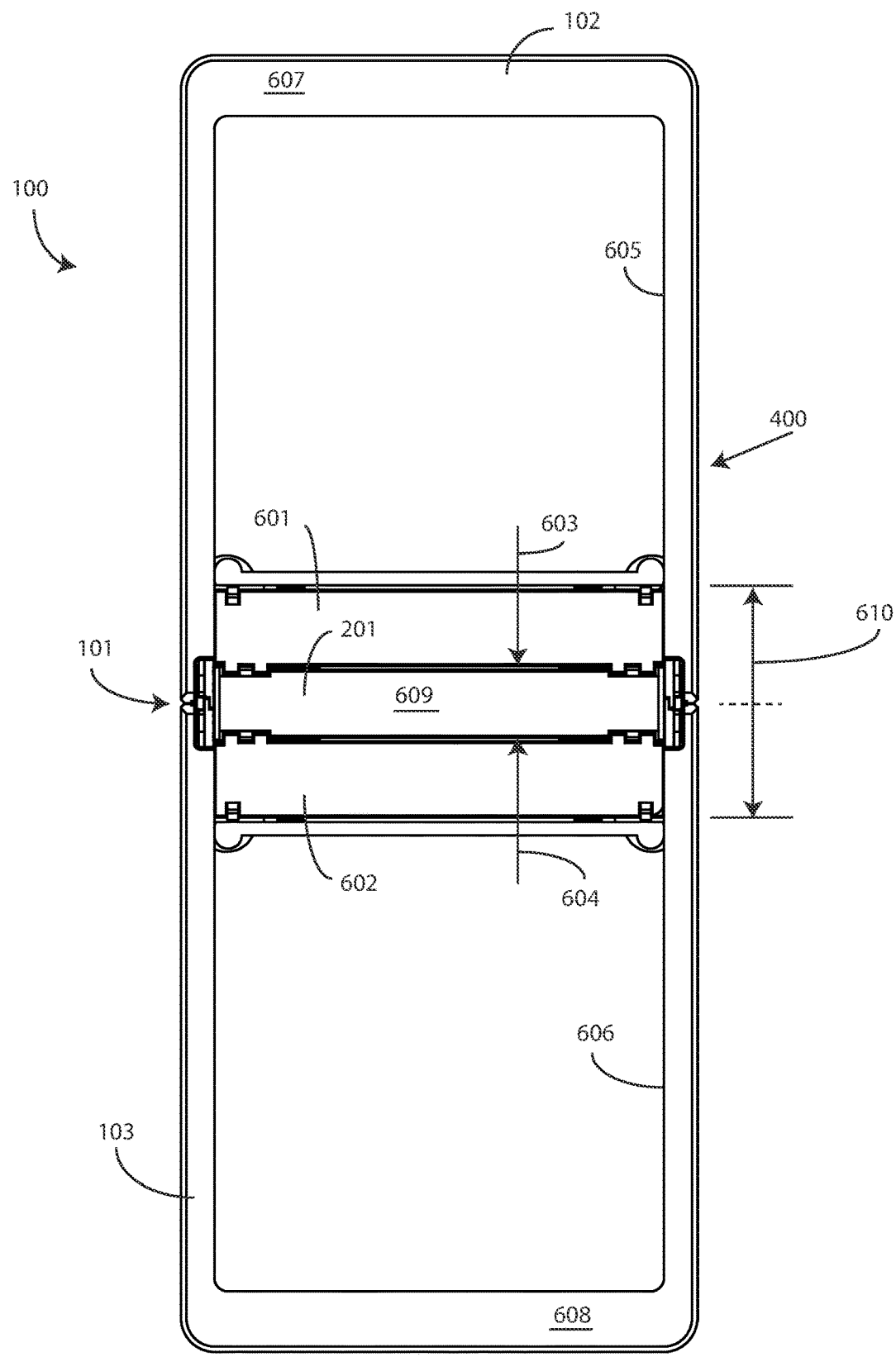
FIG. 6 illustrates a plan view of one explanatory electronic device in accordance with embodiments of the disclosure with the flexible display removed so that the hinge is visible.

Turning now to FIG. 6, the electronic device 100 is shown with the flexible display (121), as well as any overlaying fascia, removed so that additional details of the hinge 101 can more readily be seen. As shown in FIG. 6, in one or more embodiments the hinge 101 includes a hinge housing 201, which can link the first device housing 102 to the second device housing 103. The hinge 101 of the hinge housing 201 can further include one or more pivots allowing the first device housing 102 to pivot about the hinge 101, which is operatively coupled to the hinge housing 201, relative to the second device housing 103.

Optionally, as will be described in more detail below, one or more support plates can be included to translate within the first device housing 102 and the second device housing 103, respectively. The use of such support plates is advantageous when the flexible display 121 used in the electronic device 100. However, where rigid displays are used, such as in the embodiment of FIG. 69, the support plates can be omitted.

In this illustrative embodiment, a first support plate 601 is pivotally coupled to a first side 603 of the hinge housing 201. The first support plate 601 extends distally into the first device housing 102 from the first side 603 of the hinge housing 201. A second support plate 602 is then pivotally coupled to a second side 604 of the hinge housing 201. The second support plate 602 then extends distally into the second device housing 103 from the second side 604 of the hinge housing 201.

In one or more embodiments, the first device housing 102 and the second device housing 103 each define linear recesses 605,606 into which a display (105)—be it a flexible display (121) or rigid display—may be positioned. In one or more embodiments where a flexible display (121) is used, the flexible display (121) is positioned within the linear recess 605 of the first device housing 102 and the linear recess 606 of the second device housing 103 so that it—or a fascia disposed atop the flexible display (121)—sits flush with the interior surface 607 of the first device housing 102 and the interior surface 608 of the second device housing 103. Where a flexible display (121) is used, the flexible display (121) will span the hinge 101 by passing across the hinge housing 201 in such an embodiment.

By contrast, where two displays are used (as shown below in FIG. 69), a first display can be positioned within the linear recess 605 of the first device housing 102. A second display can then be positioned in the linear recess 606 of the second device housing 103. This allows each display—or a fascia disposed atop each display—to sit flush with the interior surface 607 of the first device housing 102 and the interior surface 608 of the second device housing 103. Where two displays are used, the hinge 101 and hinge housing 201 will separate one display from the other. The hinge housing 201 of such an embodiment can be made narrower than that shown in FIG. 6 due to the fact that it need not provide mechanical support for a display as is the case when the display is a flexible display (121).

In still other embodiments, the linear recess 605,606 will be omitted. The display(s), whether flexible or not, as well as any accompanying fascia, may then simply sit atop planar surfaces defined by the interior surface 607 of the first device housing 102 and the interior surface 608 of the second device housing 103.

Where the linear recesses 605,606 are included and a flexible display (121) is used, the flexible display (121) can be positioned within these linear recesses 605,606 to span the hinge 101 and hinge housing 201. Regardless of whether the linear recesses 605,606 are included, when the first device housing 102 pivots about the hinge 101 and hinge housing 201 relative to the second device housing 103 to the axially displaced open position 400 shown in FIG. 6, the first support plate 601, the hinge housing 201, and the second support plate 602 bridge the linear recesses 605,606 (or planar interior surfaces in the other embodiment) to provide positive mechanical support for the flexible display (121).

Where electrical components, e.g., processors, memories, communication circuits, and other components described in the block diagram schematic (110) of FIG. 1 are positioned in each of the first device housing 102 and the second device housing 103, a flexible substrate can be included to electrically couple these components together across the hinge 101 and through the hinge housing 201. Illustrating by example, in one or more embodiments the hinge housing 201 can include a crescent shaped duct through which the flexible substrate can pass. In one or more embodiments, the flexible substrate, which can bend as the first device housing 102 and the second device housing 103 pivot about the hinge 101 to the closed position (200) of FIG. 2, allows electrical signals to pass back and forth between circuit components disposed in the first device housing 102 and the second device housing 103.

In one or more embodiments, one or more spring-loaded trays can be included within one or both of the first device housing 102 or the second device housing 103. Illustrating by example, a spring-loaded and slidable tray can be disposed within the first device housing 102. One example of such a solution is described in commonly assigned U.S. Pat. No. 10,491,725 to Harmon et al., entitled "Hinged Electronic Device with Moving Support Plates for a Flexible Display and Corresponding Systems," which is incorporated herein by reference. Alternatively, the tray could be disposed in the second device housing 103. Additionally, in other embodiments both the first device housing 102 and the second device housing 103 could include trays as well.

In one or more embodiments, a first end of a flexible display (121) can be fixedly coupled to the second device housing 103. The second end of the flexible display (121) can then be coupled to the sliding tray. In one or more embodiments, the tray is slidably coupled to the first device housing 102 and is biased away from the hinge 101 and hinge housing 201 by a spring. It should be noted that while a spring is used to bias the tray away from the hinge 101 and hinge housing 201 in some embodiments, in other embodiments the spring can be replaced by a damper device or other equivalent. Where configured as a damper device, the damper device can include a spring with a nested shock damper, which can be pneumatic or hydraulic, to dampen the action of the spring. Other devices suitable for use instead of the spring will be obvious to those of ordinary skill in the art having the benefit of this disclosure.

Where a tray is included, the spring(s) can operably bias the tray away from the hinge 101 to flatten the flexible display (121) when the first device housing 102 pivots about the hinge 101 away from the second device housing 103 to the open position 400. A first end of the flexible display (121) can be coupled to the second device housing 103, while a second end is coupled to the tray. In one or more embodiments, the spring biases the tray away from the hinge 101, and thus away from the second device housing 103, to remove slack from the flexible display (121) when the first device housing 102 is pivoted about the hinge 101 toward the second device housing 103 to the closed position (200) of FIG. 2.

While inclusion of a spring-loaded tray works well in practice, experimental testing has shown that the inclusion of a tray, with one end of the display (105) coupled thereto, can cause a flexible display (121) to "feel" like its moving when a user is delivering user input to the flexible display (121). To eliminate this tactile artifact, and to provide for more display stability when a user is interacting with the flexible display (121) with a finger or stylus, in the illustrative embodiment of FIG. 6 the hinge 101 is configured to alter a displacement 610 between the hinge housing 201 and the first device housing 102 and second device housing 103, respectively, when the first device housing 102 and the second device housing 103 pivot about the hinge housing 201 between the axially displaced open position 400 of FIG. 6 and the closed position (200) of FIG. 2. Advantageously, this changing of the displacement 610 eliminates the need for any spring-loaded tray, as it allows the flexible display (121) to be fixedly coupled to the first device housing 102 and the second device housing 103, respectively. Moreover, the flexible display 121 is able to fully extend when the electronic device 100 is in the axially displaced open position 400 of FIG. 6, while still forming a proper service loop (shown, for example in FIG. 9 below) when the electronic device 100 is in the closed position (200).

Effectively, the hinge 101 of FIG. 6 causes the hinge housing 201 to get closer to the interior ends of the first device housing 102 and second device housing 103, respectively, when the electronic device 100 is in the axially displaced open position 400, while moving the hinge housing 201 farther from these interior ends of the first device housing 102 and second device housing 103, respectively, when the electronic device 100 is in the closed position (200). This changing distance, represented by displacement 610 in FIG. 6, compensates for the difference between the length of the flexible display (121) that bends when the first device housing 102 pivots about the hinge 101 relative to the second device housing 103 to the closed position (200) and the length of the mechanical mechanism supporting the flexible display (121) that is defined by the first support plate 601, the second support plate 602, and the hinge housing 201. This change in displacement 610 causes an interior surface 609 of the hinge housing 201 to be positioned farther from the first device housing 102 and the second device housing 103, respectively, when the first device housing 102 is pivoted about the hinge housing 201 relative to the second device housing 103 to the closed position (200) than when the first device housing 102 is pivoted about the hinge housing 201 relative to the second device housing 103 to the axially displaced open position 400. How this occurs will be illustrated in more detail below with reference to the various hinge assemblies illustrated in FIGS. 16-28, FIGS. 29-44, and FIGS. 48-68.

Figure 7:
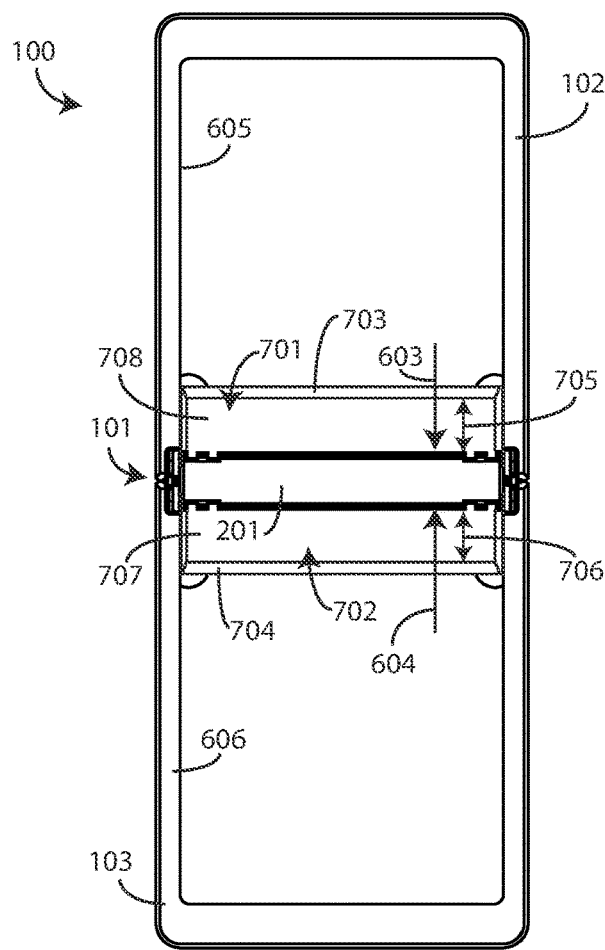
FIG. 7 illustrates a perspective view of one explanatory electronic device in accordance with embodiments of the disclosure with the flexible display removed so that the hinge is visible.

Turning now to FIG. 7, illustrated therein is another view of the electronic device 100 is shown with the first support plate (601) and the second support plate (602) removed so that additional details of the first device housing 102 and the second device housing 103 can more readily be seen. As shown in FIG. 7, in one or more embodiments each of the first device housing 102 and the second device housing 103 define a first chamber 701 and a second chamber 702, respectively.

In this illustrative embodiment, the first chamber 701 of the first device housing 102 is disposed to a first side 603 of the hinge housing 201, while the second chamber 702 of the second device housing 103 is disposed to the second side 604 of the hinge housing 201. The hinge housing 201 then separates the first chamber 701 defined by the first device housing 102 from the second chamber 702 defined by the second device housing 103.

In one or more embodiments, the first chamber 701 and the second chamber 702 provide recessed, open space within the first device housing 102 and the second device housing 103, respectively, that allows the flexible display (121) room to form a service loop when the first device housing 102 and the second device housing 103 pivot about the hinge 101 to the closed position (200). One example of such a service loop will be shown below with reference to FIG. 9. This service loop occurs due to the fact that the flexible display (121) deforms when the first device housing 102 pivots about the hinge 101 relative to the second device housing 103 from the axially displaced open position 400 to the closed position (200).

In one or more embodiments, each of the first chamber 701 and the second chamber 702 comprises an inclined plane 703,704. In this illustrative embodiment, the first chamber 701 defines an inclined plane 703 that is disposed distally a predefined distance 705 across a bottom surface 707 of the first chamber 701 from the hinge housing 201. Similarly, the second chamber 702 defines an inclined plane 704 that is disposed distally a predefined distance 706 across a bottom surface 708 of the second chamber 702 from the hinge housing 201.

In this illustrative embodiment, the first device housing 102 and the second device housing 103 each define linear recesses 605,606 into which a display (105) may be positioned. In such an embodiment, each of the first chamber 701 and the second chamber 702 is disposed between a respective linear recess 605,606 and the hinge 101. For example, in this illustrative embodiment the first chamber 701 of the first device housing 102 is disposed between the linear recess 605 of the first device housing 102 and the hinge 101. Similarly, the second chamber 702 of the second device housing 103 is disposed between the linear recess 606 of the second device housing 103 and the hinge 101.

While shown as flat surfaces spanning the width of the first chamber 701 and the second chamber 702, respectively, in FIG. 7, it should be noted that the inclined planes 703,704 could be augmented with, or replaced by, other inclined plane structures. Illustrating by example, turning now to FIG. 8, in this illustrative embodiment each of the first support plate 601 and the second support plate 602 is bounded by inclined apertures 801,802,803,804 within which posts extending distally from the edges of the first support plate 601 and second support plate 602 insert. This configuration latches and retains the posts within the inclined apertures 801,802,803,804, thereby defining an enclosed track within which the posts may travel as the electronic device 100 pivots between the axially displaced open position (400) and the closed position (200).

Figure 8:
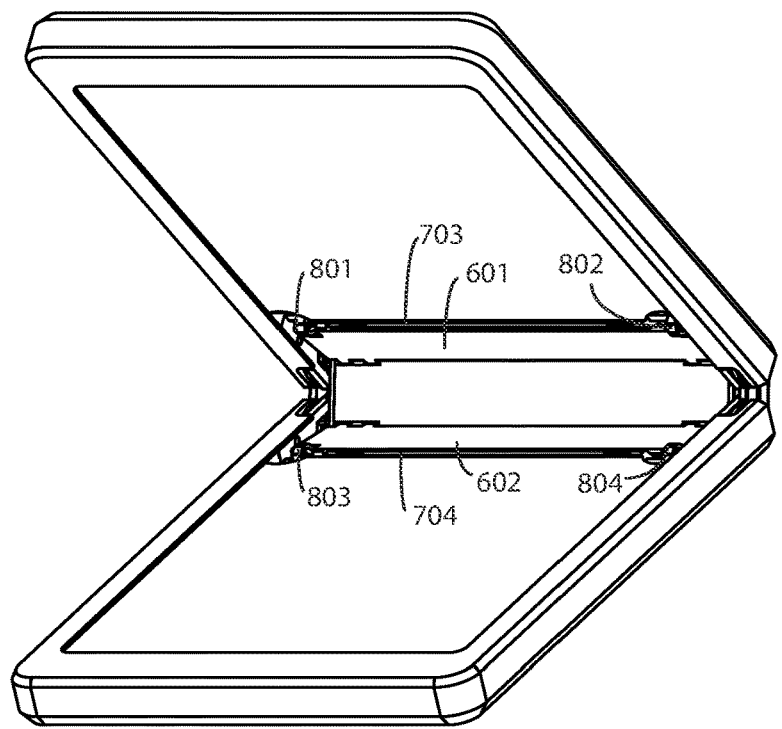
FIG. 8 illustrates a perspective view of one explanatory electronic device in accordance with embodiments of the disclosure in a partially open position, and with the flexible display removed so that the hinge is visible.

In the illustrative embodiment of FIG. 8, the inclined apertures 801,802,803,804 are included in addition to the inclined planes 703,704. However, in other embodiments the inclined apertures 801,802,803,804 will be omitted. In still other embodiments, the inclined apertures 801,802,803,804 will replace the inclined planes 703,704. The operation of the inclined apertures 801,802,803,804 will be more clearly illustrated below in FIGS. 16-18 and 27-28.

Figure 9:
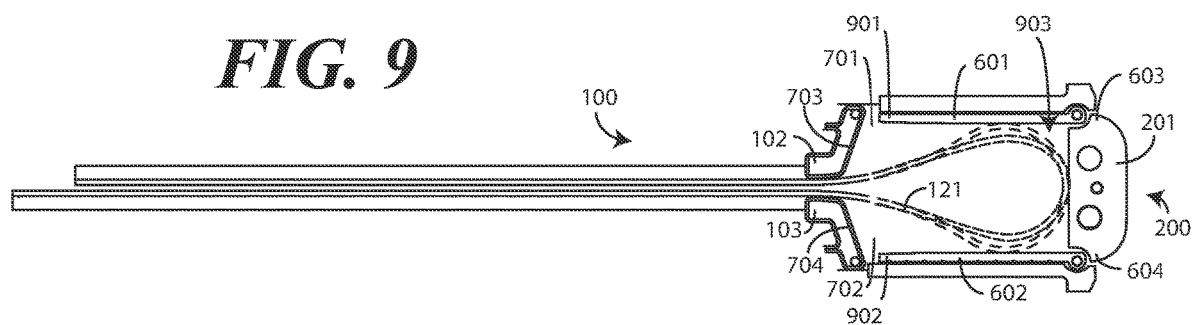
FIG. 9 illustrates a cut away view of a hinge portion of an electronic device in accordance with one or more embodiments of the disclosure when the electronic device is in the closed position.

Turning now to FIG. 9, illustrated therein is a partial cut away view of the electronic device 100 showing the mechanical mechanism facilitating support of the flexible display 121 during bending operations. In this illustration, the flexible display 121 is positioned within the first chamber 701 and second chamber 702 of the first device housing 102 and the second device housing 103, respectively. As shown, the first device housing 102 defines the first chamber 701, while the second device housing 103 defines the second chamber 702.

As shown in FIG. 9, the first device housing 102 and the second device housing 103 have been pivoted about the hinge housing 201 to the closed position 200. In one or more embodiments, when this occurs, a distal end 901,902 of each of the first support plate 601 and the second support plate 602 travels along its respective inclined plane 703,704 between a first position (shown in FIG. 10) within the first device housing 102 and the second device housing 103, respectively, to a second position (shown in FIG. 9) within the first device housing 102 and the second device housing 103, respectively.

Figure 10:
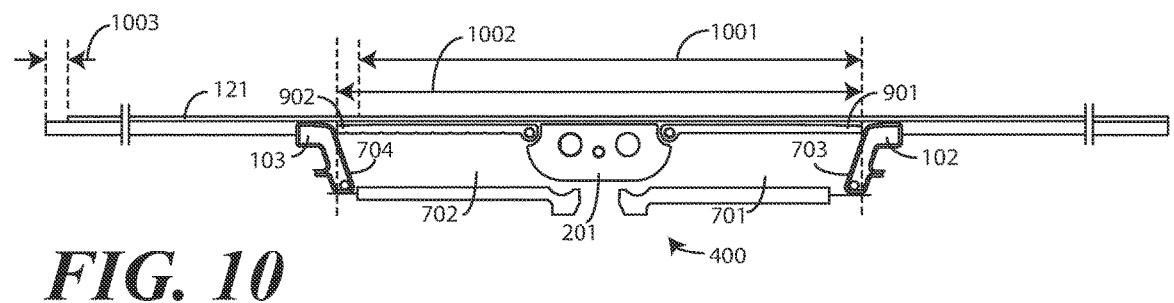
FIG. 10 illustrates a cut away view of a hinge portion of an electronic device in accordance with one or more embodiments of the disclosure when the electronic device is in the axially displaced open position.

The distal ends 901,902 of each of the first support plate 601 and the second support plate 602 therefore travel, in one or more embodiments, along their respective inclined planes 703,704 through the first chamber 701 and the second chamber 702 between the first position of FIG. 10 within the first device housing 102 and the second device housing 103, respectively, to the second position of FIG. 9 within the first device housing 102 and the second device housing 103, respectively, when the first device housing 102 and the second device housing 103 pivot about the hinge housing 201 from an axially displaced open position (400) to the closed position 200 of FIG. 9. When this occurs, the first support plate 601, the hinge housing 201, and the second support plate 602 define boundaries within which the flexible display 121 defines a service loop 903.

The area opened for the service loop 903 by the translation of the first support plate 601 and the second support plate 602, in one embodiment, provides a radius that is sufficient to prevent the flexible display 121 from kinking or folding. The opened area also works to minimize mechanical memory problems when the first device housing 102 and the second device housing 103 pivot about the hinge housing 201 to the open position (400).

As described above, the first support plate 601 is pivotally coupled to a first side 603 of the hinge housing 201. The first support plate 601 extends distally into the first chamber 701 from the first side 603 of the hinge housing 201. Similarly, the second support plate 602 is pivotally coupled to a second side 604 of the hinge housing 201. The second support plate 602 extends distally into the second chamber 702 from the second side 604 of the hinge housing 201. The distal end 901 of the first support plate 601 and the distal end 902 of the second support plate 602 each travel along its respective inclined plane 703,704 between a first position within the first chamber 701 and the second chamber 702, respectively, as shown in FIG. 10, to a second position within the first chamber 701 and the second chamber 702, respectively, as shown in FIG. 9, when the first device housing 102 and the second device housing 103 pivot about the hinge housing 201 from the axially displaced open position (400) to the closed position 200.

The translation of the first support plate 601 and the second support plate 602 along the inclined planes 703,704 from a shallow position (FIG. 10) within the first device housing 102 and the second device housing 103, to the deep position within the first device housing 102 and the second device housing 103 shown in FIG. 9, when the first device housing 102 pivots about the hinge housing 201 relative to the second device housing 103 from the axially displaced open position (400) to the closed position 200, results in the first support plate 601 and the second support plate 602 abutting the outer major face of the flexible display 121 when the first device housing 102 and the second device housing 103 are in the closed position 200.

Turning now to FIG. 10, the first device housing 102 and the second device housing 103 have been rotated about the hinge housing 201 to the axially displaced open position 400. When this occurs, due to the action of the hinge housing 201, the distal ends 901,902 of the first support plate 601 and the second support plate 602 translate up their respective inclined planes 703,704, through the first chamber 701 and the second chamber 702, from the second position of FIG. 9 to the first position shown in FIG. 10. In the illustrative embodiment of FIG. 10, when the distal ends 901,902 of the first support plate 601 and the second support plate 602 fully translate up their respective inclined planes 703,704 from the second position of FIG. 9 to the first position shown in FIG. 10, they sit atop ends of the inclined planes 703,704.

In this position, and as shown in FIG. 10, when the distal ends 901,902 of the first support plate 601 and the second support plate 602 fully translate up their respective inclined planes 703,704 from the second position of FIG. 9 to the first position shown in FIG. 10, the first support plate 601, the hinge housing 201, and the second support plate 602 bridge the linear recess (605) of the first device housing 102 and the linear recess (606) of the second device housing 103 when the first device housing 102 and the second device housing 103 are in an axially displaced open position 400 shown in FIG. 10. Since the distal ends 901,902 of the first support plate 601 and the second support plate 602 have translated up their respective inclined planes 703,704 from the second position of FIG. 9 to the first position shown in FIG. 10, the first support plate 601, the second support plate 602, and the hinge housing 201 work in tandem to mechanically support the flexible display 121.

By comparing FIGS. 9 and 10, it can be seen that when the flexible display 121 is fixedly coupled to the first device housing 102 and also fixedly coupled to the second device housing 103, with the first device housing 102, hinge housing 201, and second device housing 103 configured to cause the flexible display 121 to extend and become substantially planar when the first device housing 102 and second device housing 103 are in the axially displaced open position 400, the path length 1002 of the mechanical mechanism defined by the first support plate 601, the second support plate 602, and the hinge housing 201 can be different than the path length 1001 of the section of the flexible display 121 that bends when each is in the closed position 200. Said differently, where the flexible display 121 is configured to extend flat when in the axially displaced open position 400, when the folding mechanism is in the closed position 200 the length 1001 of the service loop 903 defined by the flexible display 121 and the mechanical boundaries defined by the first support plate 601, hinge housing 201, and second support plate 602 may be different.

In particular, to provide sufficient room for the service loop 903, the mechanical mechanism defined by the first support plate 601, the hinge housing 201, and the second support plate 602 may be longer than the length 1001 of the flexible display 121 that bends to define the service loop 903 by a predefined amount. This difference 1003 in length can be problematic in that it can result in either deformations in the service loop 903 when the mechanism is in the closed position 200, or alternatively it can result in mechanical strain or unevenness in the flexible display 121 when the mechanism is in the axially displaced open position 400.

While a spring-loaded plate can be used to apply tension to one end of the flexible display to compensate for the distance difference 1003 as noted above, embodiments of the disclosure provide an improved hinge mechanism that allows for the flexible display 121 to be fixedly connected to the first device housing 102 and second device housing 103, respectively, as well as to fully extend when the mechanism is in the axially displaced open position 400. At the same time, the hinge mechanism allows the flexible display 121 form a proper service loop 903 when the mechanism is in the closed position 200.

Embodiments of the disclosure accomplish this by employing one of multiple hinge mechanisms that changes a displacement (610) between the hinge housing 201 and the first device housing 102 and second device housing 103, respectively, as the first device housing 102 and second device housing 103 pivot about the hinge housing 201 between the axially displaced open position 400 and the closed position 200. Effectively, hinges configured in accordance with embodiments of the disclosure cause the hinge housing 201 to get closer to the first device housing 102 and second device housing 103, respectively, when the electronic device is in the axially displaced open position 400, and farther from the hinge housing 201 when the electronic device is in the closed position 200. This changing distance compensates for the difference between the bending length 1001 of the flexible display 121 and the length 1002 of the mechanical mechanism supporting the flexible display 121.

Figure 11:
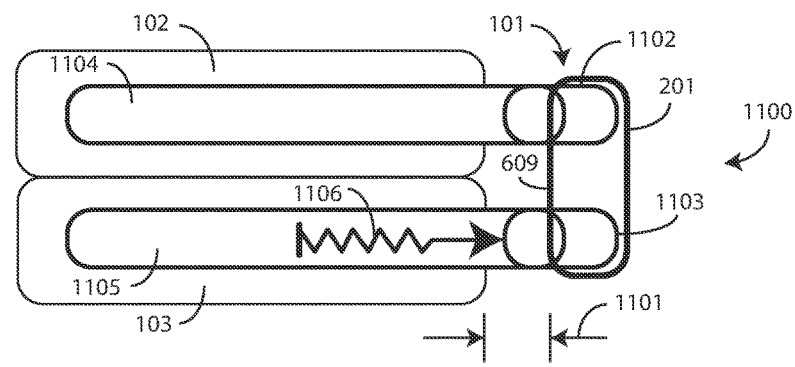
FIG. 11 illustrates a schematic block diagram of a hinge configured in accordance with one or more embodiments of the disclosure with the hinge in a closed position.
Figure 12:
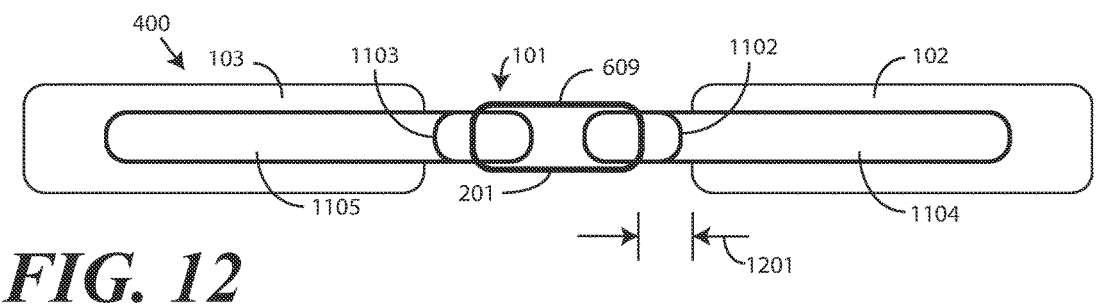
FIG. 12 illustrates a schematic block diagram of a hinge configured in accordance with one or more embodiments of the disclosure with the hinge in an axially displaced open position.

Turning now to FIGS. 11-12, illustrated therein is a general mechanical schematic illustrating one explanatory way this can be accomplished. Shown in FIGS. 11-12 is a hinge mechanism 1100 configured to change a displacement 1101,1201 between the hinge housing 201 and the first device housing 102 and second device housing 103, respectively, when the first device housing 102 and the second device housing 103 pivot about the hinge housing 201 between the axially displaced open position 400 and the closed position 200.

In one or more embodiments, the hinge housing 201 comprises a hinge 101 that couples a first device housing 102 of an electronic device to a second device housing 103 such that the first device housing 102 is pivotable about the hinge housing 201 relative to the second device housing 103 between a closed position 200 and an axially displaced open position 400. In one or more embodiments, the hinge 101 changes a displacement 1101,1201 between the first device housing 102 and the second device housing 103, respectively, when the first device housing 102 and the second device housing 103 pivot about the hinge housing 201 between the axially displaced open position 400 and the closed position 200. This allows an interior surface 609 of the hinge housing 201 to be positioned farther from the first device housing 102 and the second device housing 103, respectively, when the first device housing 102 is pivoted about the hinge housing 201 relative to the second device housing 103 to the closed position 200 than when the first device housing 102 is pivoted about the hinge housing 201 relative to the second device housing 103 to the axially displaced open position 400.

In one or more embodiments, the hinge housing 201 is coupled to a first hinge arm 1104, which is in turn coupled to the first device housing 102. Similarly, the hinge housing 201 is coupled to a second hinge arm 1105, which is coupled to the second device housing 103. In one or more embodiments, each of the first hinge arm 1104 and the second hinge arm 1105 is fixedly coupled to the first device housing 102 and the second device housing 103, respectively, but is pivotally coupled to the hinge housing 201 such that the first device housing 102 can pivot about the hinge housing 201 relative to the second device housing 103 between the closed position 200 of FIG. 11 and the axially displaced open position 400 of FIG. 12.

To facilitate a change in displacement between the first device housing 102 and the hinge housing 201, and additionally between the second device housing 103 and the hinge housing 201, in one or more embodiments a sliding mechanism is coupled between the hinge housing 201 and the first hinge arm 1104 and the second hinge arm 1105. In the illustrative embodiment of FIGS. 11 and 12, a first sliding mechanism 1102 is coupled between the first hinge arm 1104 and the hinge housing 201, while a second sliding mechanism 1103 is coupled between the second hinge arm 1105 and the hinge housing 201. The inclusion of the first sliding mechanism 1102 and the second sliding mechanism 1103 allows each of the first hinge arm 1104 and the second hinge arm 1105 to translate within the first sliding mechanism 1102 and the second sliding mechanism 1103, respectively, as the first hinge arm 1104 and second hinge arm 1105, and accordingly the first device housing 102 and the second device housing 103, pivot relative to the hinge housing 201 between the closed position 200 of FIG. 11 and the axially displaced open position 400 of FIG. 12.

Illustrating by example, in FIG. 11, the right most ends of the first hinge arm 1104 and the second hinge arm 1105 are positioned at the left most ends of the first sliding mechanism 1102 and the second sliding mechanism 1103. In one or more embodiments, a spring 1106, motor, damping device, or other mechanism can apply a force against the first sliding mechanism 1102 and the second sliding mechanism 1103 to bias each away from the distal end (the right most end in FIG. 11) of the first hinge arm 1104 and second hinge arm 1105, respectively, when the first hinge arm 1104 and second hinge arm 1105, and accordingly the first device housing 102 and the second device housing 103, pivot relative to the hinge housing 201 to the closed position 200 of FIG. 11.

By contrast, in FIG. 12 the right most end of the second hinge arm 1105 and the left most end of the first hinge arm 1104 have situated within the right most end of the second sliding mechanism 1103 and the left most end of the first sliding mechanism 1102, respectively, when the first hinge arm 1104 and the second hinge arm 1105, and accordingly the first device housing 102 and the second device housing 103, pivot relative to the hinge housing 201 to the axially displaced open position 400 of FIG. 12. Advantageously, the inclusion of the first sliding mechanism 1102 and the second sliding mechanism 1103 as coupling links between the first hinge arm 1104 and the second hinge arm 1105, respectively, allows the ends of the first hinge arm 1104 and the second hinge arm 1105 to translate within the first sliding mechanism 1102 and the second sliding mechanism 1103 as the first hinge arm 1104 and the second hinge arm 1105 pivot between the closed position 200 of FIG. 11 and the axially displaced open position 400 of FIG. 12.

While FIGS. 11 and 12 illustrate general embodiments demonstrating how the first sliding mechanism 1102 and the second sliding mechanism 1103 facilitate this translation to change the displacement 1101,1201 between the hinge housing 201 and the first device housing 102 and the second device housing 103 when the first hinge arm 1104 and the second hinge arm 1105 pivot between the axially displaced open position 400 and the closed position, specific mechanisms illustrating how this translation occurs will be shown in subsequent figures. FIGS. 11 and 12 are provided to generally illustrate the concept of translation of the first hinge arm 1104 and the second hinge arm 1105, with later figures illustrating examples of more specific embodiments.

Figure 13:
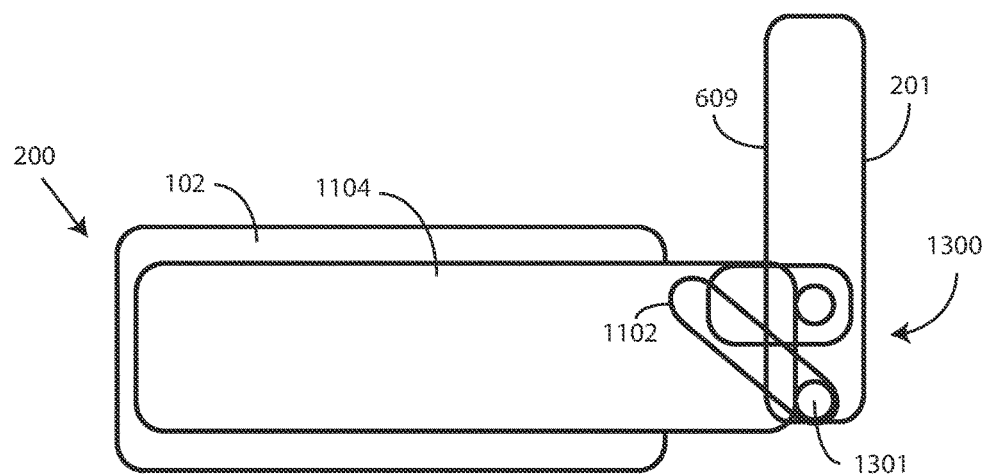
FIG. 13 illustrates a partial schematic block diagram of a hinge configured in accordance with one or more embodiments of the disclosure with the hinge in a closed position.
Figure 14:
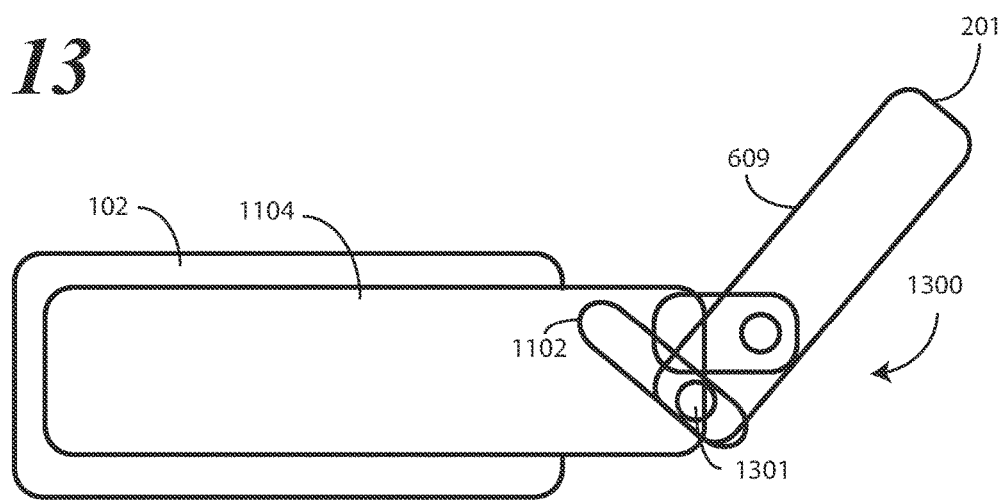
FIG. 14 illustrates a partial schematic block diagram of a hinge configured in accordance with one or more embodiments of the disclosure with the hinge in a partially open position.
Figure 15:
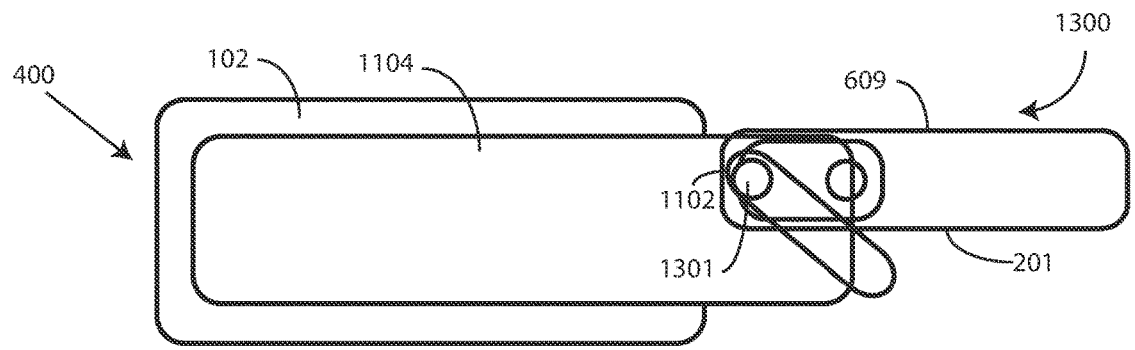
FIG. 15 illustrates a partial schematic block diagram of a hinge configured in accordance with one or more embodiments of the disclosure with the hinge in an axially displaced open position.

Turning now to FIGS. 13-15, illustrated therein is an alternate general mechanical schematic illustrating another way that a change in displacement between a first device housing and a second device housing of an electronic device and a hinge housing can occur as the first device housing and the second device housing pivot about the hinge housing between an axially displaced open position and a closed position. As with the embodiment of FIGS. 11-12, the mechanical schematic of FIGS. 13-15 illustrate general embodiments demonstrating how this occurs, while subsequent figures will illustrate more specific mechanisms. FIGS. 13-15 are provided to generally illustrate the concept of such a change in displacement, while later figures will illustrate additional details.

Additionally, shown in FIGS. 13-15 is a hinge mechanism 1300 configured to change a displacement between the hinge housing 201 and the first device housing 102 and second device housing (103), respectively, when the first device housing 102 and the second device housing (103) pivot about the hinge housing 201 between the axially displaced open position 400 of FIG. 15 and the closed position 200 of FIG. 13. Unlike FIGS. 11-12, in which both the first device housing 102 and the second device housing (103) were illustrated, it should be noted that for simplicity only half of the hinge mechanism 1300 is shown in FIGS. 13-15. For example, the first device housing 102 is shown, while the second device housing (103) is not. In practice, a mirror image of the components other than the hinge housing 201 would appear at the top of the hinge housing 201 as well in FIG. 13. The same is true with reference to FIG. 15—in practice, a mirror image of the components other than the hinge housing 201 would appear on the right side of the hinge housing 201, and so forth. Those of ordinary skill in the art having the benefit of this disclosure will readily recognize how, for example, the second device housing (103) couples to the hinge mechanism 1100 in view of the half mirror image shown in FIGS. 13-15.

As before, in the illustrative embodiment of FIGS. 13-14, the hinge housing 201 comprises a hinge that couples a first device housing 102 of an electronic device to a second device housing (103) such that the first device housing 102 is pivotable about the hinge housing 201 relative to the second device housing (103) between a closed position 200 and an axially displaced open position 400. In one or more embodiments, the hinge changes a displacement between the first device housing 102 and the second device housing (103), respectively, when the first device housing 102 and the second device housing (103) pivot about the hinge housing 201 between the axially displaced open position 400 and the closed position 200. This allows an interior surface 609 of the hinge housing 201 to be positioned farther from the first device housing 102 and the second device housing (103), respectively, when the first device housing 102 is pivoted about the hinge housing 201 relative to the second device housing 103 to the closed position 200 than when the first device housing 102 is pivoted about the hinge housing 201 relative to the second device housing 103 to the axially displaced open position 400.

In one or more embodiments, the hinge housing 201 is coupled to a first hinge arm 1104, which is in turn coupled to the first device housing 102. Similarly, the hinge housing 201 is coupled to a second hinge arm (1105), which is coupled to the second device housing (103). In one or more embodiments, each of the first hinge arm 1104 and the second hinge arm (1105) is fixedly coupled to the first device housing 102 and the second device housing (103), respectively, but is pivotally coupled to the hinge housing 201 such that the first device housing 102 can pivot about the hinge housing 201 relative to the second device housing (103) between the closed position 200 of FIG. 13 and the axially displaced open position 400 of FIG. 15.

To facilitate a change in displacement between the first device housing 102 and the hinge housing 201, and additionally between the second device housing (103) and the hinge housing 201, in one or more embodiments a sliding mechanism is again coupled between the hinge housing 201 and the first hinge arm 1104 and the second hinge arm (1105). In the illustrative embodiment of FIGS. 13-15, a first sliding mechanism 1102 is coupled between the first hinge arm 1104 and the hinge housing 201. If the second hinge arm (1105) were shown, a second sliding mechanism (1103) would be coupled between the second hinge arm (1105) and the hinge housing 201.

In FIGS. 13-15, the displacement change between the first hinge arm 1104 and the hinge housing 201 is caused by a pin 1301 that travels within the first sliding mechanism 1102 while the hinge housing 201 pivots relative to the first hinge arm 1104. As can be seen by comparing FIGS. 13-15, when the pin 1301 is at the bottom of the first sliding mechanism 1102, the interior surface 609 of the hinge housing 201 is farther from the first device housing 102 than when the pin 1301 is within the upper portion of the first sliding mechanism 1102. This travel of the pin 1301 within the first sliding mechanism 1102 therefore changes the displacement between the hinge housing 201 and the first device housing 102 (and would between the second device housing (103) and the hinge housing 201 if shown) when the first device housing 102 and the second device housing (103) pivot between the closed position 200 and the axially displaced open position 400.

Figure 16:
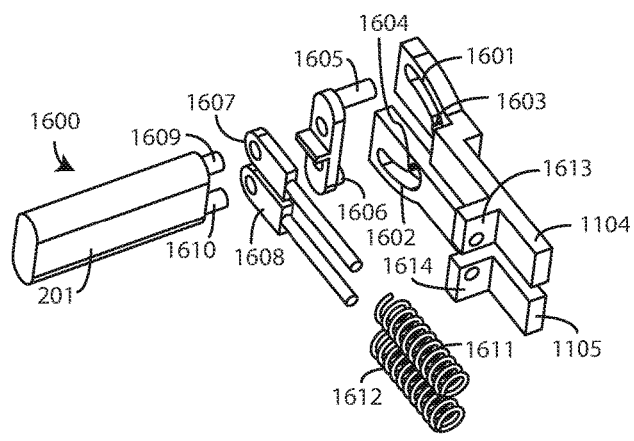
FIG. 16 illustrates an exploded view of one explanatory hinge configured in accordance with one or more embodiments of the disclosure.
Figure 17:
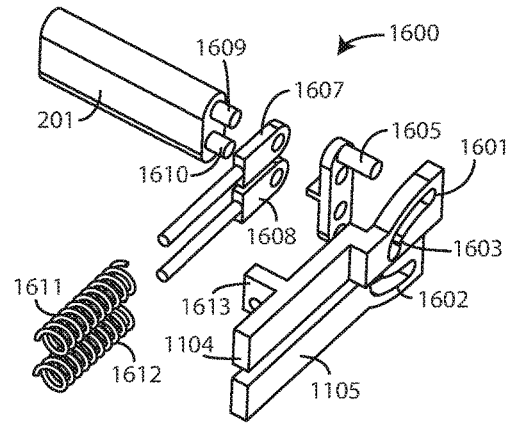
FIG. 17 illustrates another exploded view of one explanatory hinge configured in accordance with one or more embodiments of the disclosure.

Turning now to FIGS. 16-17, illustrated therein is one hinge assembly 1600 implementing some of the features, functions, mechanics, and principles illustrated in the general block diagram schematics of FIGS. 11-12 and FIGS. 13-15. In FIGS. 16-17, the first device housing (102) and second device housing (103) are not shown so that the elements of the hinge assembly 1600 can be more clearly seen. However, as previously described the first hinge arm 1104 would be fixedly coupled to the first device housing (102). Similarly, the second hinge arm 1105 would be fixedly coupled to the second device housing 103. As the first hinge arm 1104 and the second hinge arm 1105 are pivotally coupled to the hinge housing 201, the first device housing (102) can pivot about the hinge housing 201 relative to the second device housing (103) between a closed position and an axially displaced open position.

While the components of FIGS. 16-17 are shown in an exploded view for clarity, when the hinge assembly 1600 is assembled, as will be shown in FIGS. 18-28 below, the hinge housing 201 is pivotally coupled to the first hinge arm 1104 and the second device housing (103). In this illustrative embodiment, each of the first hinge arm 1104 and the second hinge arm 1105 defines a slot. Illustrating by example, the first hinge arm 1104 defines a first slot 1601, while the second hinge arm 1105 defines a second slot 1602. In this illustrative embodiment, each of the first slot 1601 and the second slot 1602 defines an arcuate slot aperture. In one or more embodiments, each arcuate slot aperture optionally defines a ridge 1603,1604 along its interior to as to define a detent at one end of the first slot 1601 and the second slot 1602, respectively, into which a pin can seat. This optional feature will be described in more detail below with reference to FIGS. 18-28.

In one or more embodiments, a first pin 1605 and a second pin 1606 are provided to translate within the first slot 1601 and the second slot 1602, respectively, as the first hinge arm 1104 and the second hinge arm 1105 pivot about the hinge housing 201 between the axially displaced open position and the closed position. As described above with reference to FIGS. 13-15, travel of the first pin 1605 and the second pin 1606 in the first slot 1601 and the second slot 1602, respectively, causes a displacement between the first device housing (102) coupled to the first hinge arm 1104 and the hinge housing 201, as well as the second device housing (103) coupled to the second hinge arm 1105 and the hinge housing 201, to change when the first hinge arm 1104 and the second hinge arm 1105 pivot between the axially displaced open position and the closed position. As previously described, in one or more embodiments the displacement is shorter when the first hinge arm 1104 (and, accordingly, the first device housing (102)) and the second hinge arm 1105 (and, accordingly, the second device housing (103)), are pivoted about the hinge housing 201 to the axially displaced open position than when the same components are pivoted about the hinge housing 201 to the closed position.

In one or more embodiments, a first spring-loaded link 1607 is coupled between the hinge housing 201 and the first hinge arm 1104. Similarly, a second spring-loaded link 1608 is coupled between the hinge housing 201 and the second hinge arm 1105. In the illustrative embodiments of FIGS. 16-17, the first spring-loaded link 1607 and the second spring-loaded link 1608 each comprise a base member defining an aperture through which an axle 1609,1610 extending distally from the hinge housing 201 may pass to engage the component defining the first pin 1605 and the second pin 1606, and a shaft. In one or more embodiments, one or more springs 1611,1612 are positioned along the shaft such that the springs 1611,1612 are held in a compressed state between a mechanical stop 1613,1614 extending distally from an interior of the first hinge arm 1104 and the second hinge arm 1105, respectively, and the base member of the first spring-loaded link 1607 and the second spring-loaded link 1608. In one or more embodiments, these springs 1611,1612 provide a biasing function biasing the hinge housing 201 away from the first device housing (102) and the second device housing (103) when the device is in the closed position, as described above with reference to FIG. 11, while the first pin 1605 and the second pin 1606 translate within the first slot 1601 and second slot 1602, respectively, which serve as sliding mechanisms as described above with reference to FIGS. 13-15.

In the illustrative embodiment of FIGS. 16-17, once the first spring 1611 is positioned about the shaft of the first spring-loaded link 1607, the first spring-loaded link 1607 is coupled between the hinge housing 201 and the first hinge arm 1104. Doing so pre-loads the first spring 1611 by biasing it between the base of the first spring-loaded link 1607 and the mechanical stop 1613 of the first hinge arm 1104. Similarly, once the second spring 1612 is positioned about the shaft of the second spring-loaded link 1608, the second spring-loaded link 1608 is coupled between the hinge housing 201 and the second hinge arm 1105. This pre-loads the second spring 1612 by biasing the same between the base of the second spring-loaded link 1608 and the mechanical stop 1614 of the second hinge arm 1105. Accordingly, the first spring-loaded link 1607 and the second spring-loaded link 1608 bias the first hinge arm 1104 and the second hinge arm 1105, respectively, toward the hinge housing 201 as the first device housing (102) coupled to the first hinge arm 1104 and the second device housing (103) coupled to the second hinge arm 1105 pivot from the closed position to the axially displaced open position.

Figure 18:
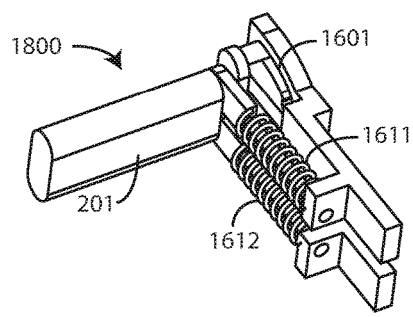
FIG. 18 illustrates an assembled view of one explanatory hinge configured in accordance with one or more embodiments of the disclosure.
Figure 19:
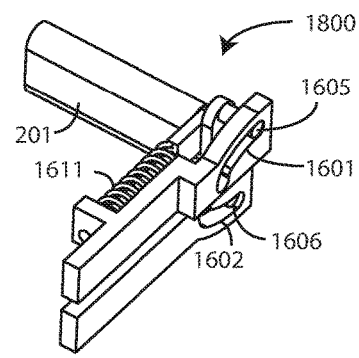
FIG. 19 illustrates another assembled view of one explanatory hinge configured in accordance with one or more embodiments of the disclosure.
Figure 20:
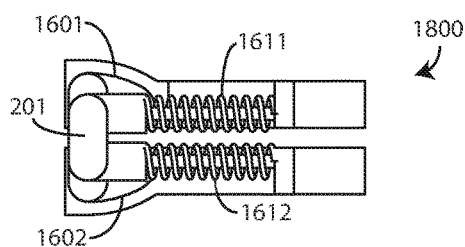
FIG. 20 illustrates the hinge of FIGS. 16-19 in the closed position.
Figure 21:
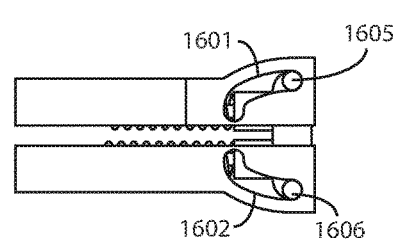
FIG. 21 illustrates the hinge of FIGS. 16-19 in the closed position.
Figure 22:
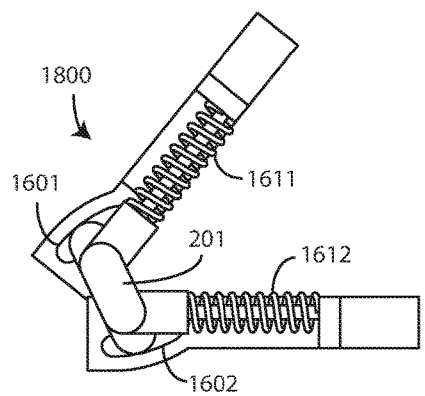
FIG. 22 illustrates the hinge of FIGS. 16-19 in the partially open position.
Figure 23:
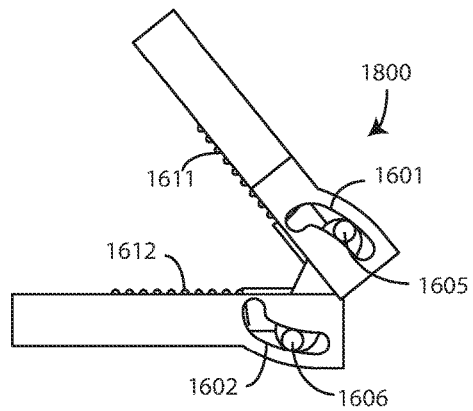
FIG. 23 illustrates the hinge of FIGS. 16-19 in the partially open position.
Figure 24:
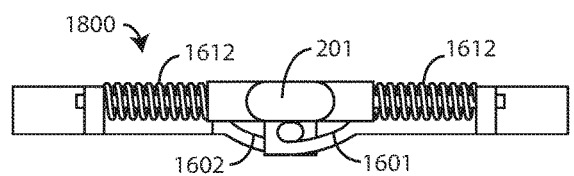
FIG. 24 illustrates the hinge of FIGS. 16-19 in the axially displaced open position.
Figure 25:
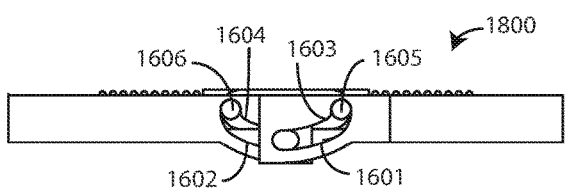
FIG. 25 illustrates the hinge of FIGS. 16-19 in the axially displaced open position.
Figure 26:
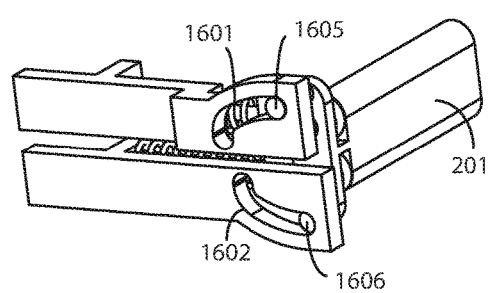
FIG. 26 illustrates the hinge of FIGS. 16-19 in the closed position.
Figure 27:
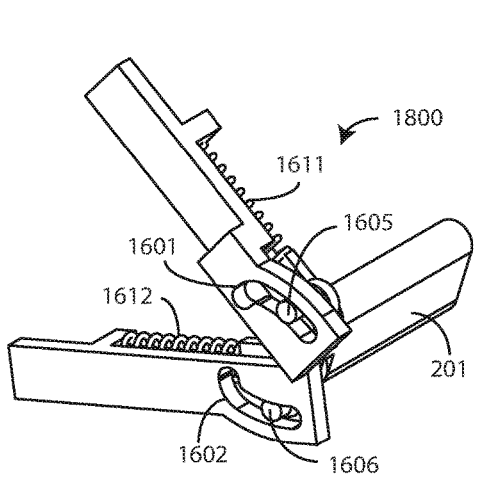
FIG. 27 illustrates the hinge of FIGS. 16-19 in the partially open position.
Figure 28:
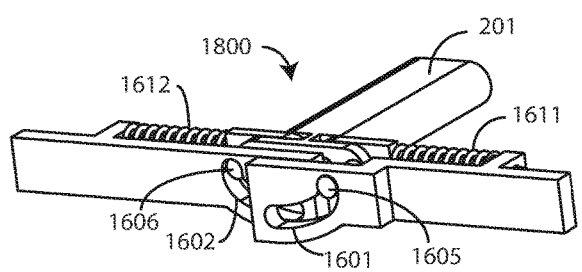
FIG. 28 illustrates the hinge of FIGS. 16-19 in the axially displaced open position.
Figure 39:
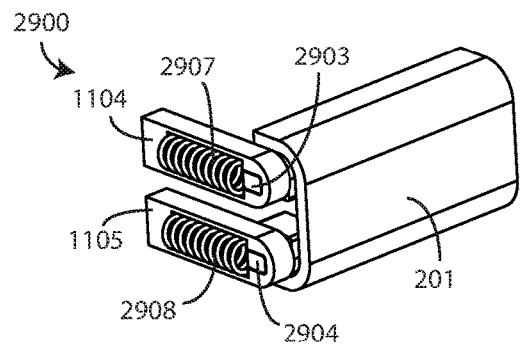
FIG. 39 illustrates the hinge of FIGS. 29-38 in the closed position.

The assembled hinge assembly 1800, as well as its operation, are shown in FIGS. 18-28. FIG. 18 illustrates a first perspective view of the hinge assembly 1800 in the closed position, while FIG. 19 provides a second perspective view thereof. FIG. 20 illustrates a right elevation view of the hinge assembly 1800 in the closed position, while FIG. 21 illustrates a left elevation view thereof. FIGS. 22-23 illustrate left and right elevation views of the hinge assembly 1800 in a partially open position, while FIGS. 24-25 illustrate the hinge assembly 1800 in the axially displaced open position. FIGS. 26-28 illustrate perspective views of the hinge assembly 1800 transitioning between the closed position, through the partially open position, to the axially displaced open position. These figures, collectively, serve to illustrate the functioning of the hinge assembly 1800 as the first pin 1605 and the second pin 1606 translating within the first slot 1601 and the second slot 1602, respectively, as the first spring 1611 and the second spring 1612 compress and expand, to alter the displacement between a first device housing (102) that would be coupled to the first hinge arm 1104 and the hinge housing 201, as well as between a second device housing (103) that would be coupled to the second hinge arm 1105 and the hinge housing 201.

As shown in FIGS. 18-20, when the first hinge arm 1104 and the second hinge arm 1105 pivot relative to the hinge housing 201 from the closed position to the axially displaced open position, the first pin 1605 and the second pin 1606 translate from a first end of the first slot 1601 and the second slot 1602, respectively, to a second end of the first slot 1601 and the second slot 1602. As best seen in FIGS. 25 and 28, where the ridges 1603,1604 are included along the interior surfaces of the first slot 1601 and the second slot 1602, they define a detent at the end of the first slot 1601 and the second slot 1602, respectively. Here, the end at which the detent is defined is located distally from the hinge housing 201, as it is the farthest end of the first slot 1601 and the second slot 1602, respectively, from the hinge housing 201. In one or more embodiments, this detent retains the first pin 1605 and the second pin 1606, respectively, therein when the first hinge arm 1104 and the second hinge arm 1105, to which the first device housing (102) and second device housing (103) would be connected, are in the axially displaced open position.

This translation of the first pin 1605 and the second pin 1606 in the first slot 1601 and the second slot 1602, respectively, facilitates a change in displacement between the first device housing (102) coupled to the first hinge arm 1104 and the hinge housing 201, and additionally between the second device housing (103) coupled to the second hinge arm 1105 and the hinge housing 201, as described above with reference to FIGS. 13-15. This is due to the fact that the first slot 1601 and the second slot 1602 function as the sliding mechanism described with reference to those figures.

The translation of the first pin 1605 and the second pin 1606 in the first slot 1601 and the second slot 1602 also causes the first hinge arm 1104 and the second hinge arm 1105 to symmetrically rotate relative to the hinge housing 201. When one of the first hinge arm 1104 or the second hinge arm 1105 rotates due to one device housing coupled to a hinge arm pivoting relative to the hinge housing 201, the first pin 1605 and second pin 1606, being coupled to a single fixed component, ensure that the other of the first hinge arm 1104 or the second hinge arm 1105 also rotates, thereby creating symmetry of rotation between the first hinge arm 1104 and the second hinge arm 1105.

Additionally, when the first hinge arm 1104 and the second hinge arm 1105 pivot about the hinge housing 201 to the closed position, the first spring 1611 and the second spring 1612 are unloaded. This release of compression allows the hinge housing 201 to bias away from the first device housing (102) coupled to the first hinge arm 1104 and the hinge housing 201, and additionally between the second device housing (103) coupled to the second hinge arm 1105 and the hinge housing 201, as described above with reference to FIG. 11.

Accordingly, the embodiment of FIGS. 18-28 implements the concepts described above with reference to FIGS. 11-15, thereby causing a displacement between the first device housing (102) coupled to the first hinge arm 1104 and the hinge housing 201, and additionally between the second device housing (103) coupled to the second hinge arm 1105 and the hinge housing 201, when the first hinge arm 1104 and the second hinge arm 1105 pivot relative to the hinge housing 201 between the axially displaced open position and the closed position. As previously noted, in this illustrative embodiment the displacement is shorter when the first device housing (102) coupled to the first hinge arm 1104 and the second device housing (103) coupled to the second hinge arm 1105 are pivoted about the hinge housing 201 to the axially displaced open position than when the first device housing (102) coupled to the first hinge arm 1104 and second device housing (103) coupled to the second hinge arm 1105 are pivoted about the hinge housing 201 to the closed position.

Turning now to FIGS. 29-30, illustrated therein is an alternate hinge assembly 2900 implementing some of the features, functions, mechanics, and principles illustrated in the general block diagram schematics of FIGS. 11-12 and FIGS. 13-15. The hinge assembly 2900 of FIGS. 29-30 eliminates the need for pins translating in slots as discussed above with reference to FIGS. 13-15, and instead employs a unique asymmetrical perimeter of cams 2901,2902 extending from the first hinge arm 1104 and the second hinge arm 1105, respectively.

As before, the first device housing (102) and second device housing (103) are not shown so that the elements of the hinge assembly 2900 can be more clearly seen. Additionally, as previously described the first hinge arm 1104 would be fixedly coupled to the first device housing (102). Similarly, the second hinge arm 1105 would be fixedly coupled to the second device housing 103. As the first hinge arm 1104 and the second hinge arm 1105 are pivotally coupled to the hinge housing 201, the first device housing (102) can pivot about the hinge housing 201 relative to the second device housing (103) between a closed position and an axially displaced open position. The components of FIGS. 29-30 are shown in an exploded view for clarity. However, when the hinge assembly 2900 is assembled, as will be shown in FIGS. 31-38 below, the hinge housing 201 is pivotally coupled to the first hinge arm 1104 and the second device housing 103.

As before, the hinge housing 201 is pivotally coupled to a first hinge arm 1104 and a second hinge arm 1105. Since a first device housing (102) would be coupled to the first hinge arm 1104, and since a second device housing (103) would be coupled to the second hinge arm 1105, the first device housing (102) would be pivotable about the hinge housing 201 relative to the second device housing (103) between an axially displaced open position and a closed position as previously described.

In this illustrative embodiment, the hinge assembly 2900 comprises a first post 2903 and a second post 2904. In one or more embodiments, a first cam 2901 extends distally from an end of the first hinge arm 1104 toward the hinge housing 201. Similarly, a second cam 2902 extends distally from an end of the second hinge arm 1105 toward the hinge housing 201.

In one or more embodiments, the hinge assembly 2900 can optionally include interlocking gears 2920 that situate against corresponding gears 2919 positioned about the first post 2903 and the second post 2904. In one or more embodiments, the interlocking gears 2920 interlock with the gears 2919 positioned about the first post 2903 and the second post 2904. When one of the first post 2903 or the second post 2904 rotates due to one device housing coupled to a hinge arm pivoting relative to the hinge housing 201, the interlocking gears 2920 ensure that the other of the first post 2903 or the second post 2904 also rotates, thereby creating symmetry of rotation between the first hinge arm 1104 and the second hinge arm 1105.

In one or more embodiments the interlocking gears 2920 comprise a first toothed wheel and a second toothed wheel that engage a first toothed wheel positioned about the first post 2903 and a second toothed wheel positioned about the second post 2904. The engagement of the first toothed wheel and the second toothed wheel of the interlocking gears 2920 with the first toothed wheel and second toothed wheel of the first post 2903 and the second post 2904 causes a symmetric angular rotation of the first device housing (102) and the second device housing (103) when the first hinge arm 1104 and the second hinge arm 1105 each pivot about the hinge housing 201.

In one or more embodiments, the first post 2903 and the second post 2904 are generally rectangular in cross section, as best seen in FIG. 30. In this illustrative embodiment, the first post 2903 and the second post 2904 each have a chamfered rectangular cross section, which is a rectangular cross section where the corners have been chamfered to define a curved transition between minor and major faces rather than an angular one.

In one or more embodiments, the first cam 2901 defines a first aperture 2905. Similarly, the second cam 2902 defines a second aperture 2906. In one or more embodiments, the first cam 2901 and the second cam 2902 each define generally rectangular apertures. In this illustrative embodiment, the first cam 2901 and the second cam 2902 each define a chamfered rectangular aperture, which again is a rectangular cross section where the corners have been chamfered to define a curved transition between minor and major faces rather than an angular one.

In one or more embodiments, the chamfered rectangular apertures of the first cam 2901 and the second cam 2902 each have a major axis (horizontal axis into the page as viewed in FIG. 29) that is greater in length than a corresponding major axis of the chamfered rectangular cross sections of the first post 2903 and the second post 2904. The minor axis, oriented orthogonally with this major axis, is shorter than the major axis. This difference in major axis lengths between that of the chamfered rectangular apertures of the first cam 2901 and the second cam 2902 compared to that of the first post 2903 and the second post 2904 allows the first post 2903 to translate within the first aperture 2905 of the first cam 2901 when the first hinge arm 1104 pivots about the hinge housing 201 between the axially displaced open position and the closed position. Similarly, the second post 2904 translates within the second aperture 2906 of the second cam 2902 when the second hinge arm 1105 pivots about the hinge housing 201 between the axially displaced open position and the closed position.

In one or more embodiments, this translation causes a change in the displacement between a first device housing (102) coupled to the first hinge arm 1104 and the hinge housing 201, and a second device housing (103) coupled to the second hinge arm 1105. As before, and as will be illustrated with FIGS. 31-38 below, in one or more embodiments the displacement is shorter when the first device housing (102) and the second device housing (103) are pivoted about the hinge housing 201 to the axially displaced open position than when the first device housing (102) and second device housing (103) are pivoted about the hinge housing 201 to the closed position.

Translation of the first post 2903 within the first aperture 2905 of the first cam 2901 and the second post 2904 within the second aperture 2906 of the second cam 2902 in the hinge assembly 2900 of FIGS. 29-30 occurs as a result of three elements. These three elements include the shape of the outer perimeter of the first cam 2901 and the second cam 2902, the shape of the interior surface of the hinge housing 201 into which the first cam 2901 and the second cam 2902 are situated, and the action of a first spring 2907 and a second spring 2908, which are situated within openings of the first hinge arm 1104 and the second hinge arm 1105, respectively.

Beginning with the latter, in one or more embodiments a first spring 2907 and a second spring 2908 are positioned within openings (best seen in FIG. 30) of the first hinge arm 1104 and the second hinge arm 1105, respectively. The first spring 2907 and second spring 2908 are biased between ends of these openings and the first post 2903 and the second post 2904, respectively. In this configuration, the first spring 2907 and the second spring 2908 bias the first hinge arm 1104 and the second hinge arm 1105, respectively, toward the hinge housing 210 as the first hinge arm 1104 (and accordingly a first device housing (102) coupled thereto) and the second hinge arm 1105 (and accordingly the second device housing (103) coupled thereto) pivot from the closed position to the axially displaced open position. This action of the first spring 2907 and the second spring 2908 is shown illustratively in FIGS. 33-35, 39, 41, and 43.

Meanwhile, the outer perimeter of the first cam 2901 and the second cam 2902 has a unique shape. In one or more embodiments, the first cam 2901 and the second cam 2902 each define an asymmetrical perimeter. As is illustrated in FIGS. 36-38, 40, 42, and 44, in one or more embodiments this asymmetrical perimeter causes a loading and compression of the first spring 2907 and the second spring 2908 as the first hinge arm 1104 (and accordingly a first device housing (102) coupled thereto) and the second hinge arm 1105 (and accordingly the second device housing (103) coupled thereto) pivot from the closed position to the axially displaced open position.

In this illustrative embodiment, the outer perimeter of each cam defines a planar top 2909, a first side 2910 oriented substantially orthogonally with the planar top 2909 by a chamfered corner, and a second side 2911, also oriented substantially orthogonally with the planar top 2909 by another chamfered corner. The first side 2910 extends distally from the planar top 2909 to an intersection 2912 between the first side 2910 and an arched rocker 2913 that wraps around the aperture of the cam with an increasingly greater thickness. The arched rocker 2913 then terminates at an indent 2914. A convex arch 2915 then extends from the indent 2914 to another indent 2916 at a termination of the second side 2911.

The interior surface of the hinge housing 201 into which the first cam 2901 and the second cam 2902 situate then defines a U-shaped recess. As the first cam 2901 and the second cam 2902 rotate within this U-shaped recess, the arched rocker 2913, which extends distally from the first side 2910 by a distance less than the indent 2914 extends distally from the convex arch 2915, changes the position of the first post 2903 and the second post 2904 within the first aperture 2905 and the second aperture 2906, respectively, thereby altering the displacement between the first device housing (102) and the second device housing (103) as previously described. Rotation of the first hinge arm 1104 and the second hinge arm 1105 to the axially displaced open position compresses the springs as the arched rocker of each cam moves the corresponding post to the end of the aperture. Rotation of the first hinge arm 1104 and the second hinge arm 1105 to the closed position allows the springs to expand, thereby moving the corresponding post to the opposite end of its respective aperture. Accordingly, displacement is changed via the action of the outer perimeter shapes of the first cam 2901 and the second cam 2902 operating in tandem with the first spring 2907 and the second spring 2908. This action is shown in FIGS. 33-38 and FIGS. 40, 42, and 44.

Turning now to FIGS. 31-44, the hinge assembly 2900 is shown in its assembled configuration. FIGS. 36-38 and FIGS. 40, 42, and 44 are shown in sectional view so that the action of the perimeters of the first cam 2901 and the second cam 2902 can be clearly seen.

Figure 40:
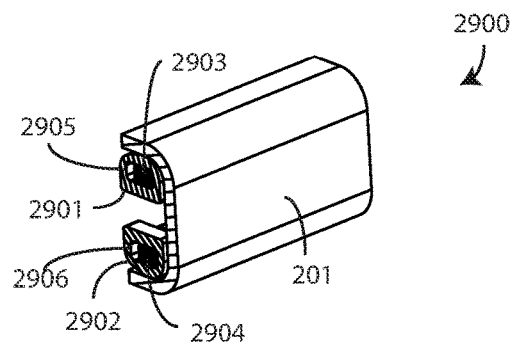
FIG. 40 illustrates a sectional view of the hinge of FIG. 39.
Figure 41:
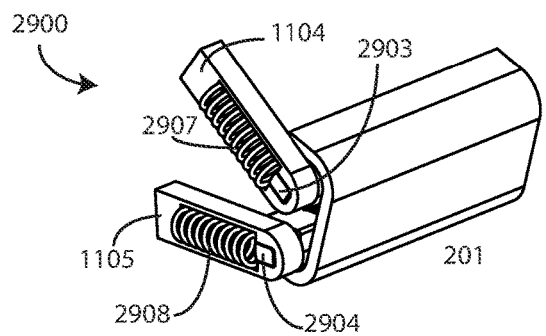
FIG. 41 illustrates the hinge of FIGS. 29-38 in the partially open position.
Figure 42:
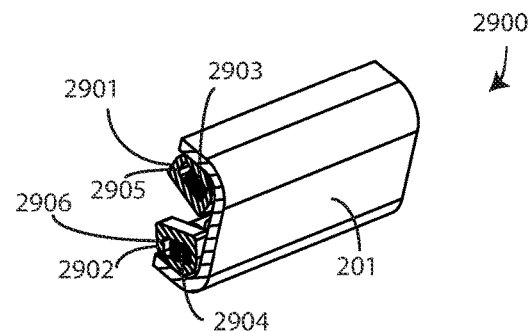
FIG. 42 illustrates a sectional view of FIG. 41.
Figure 43:
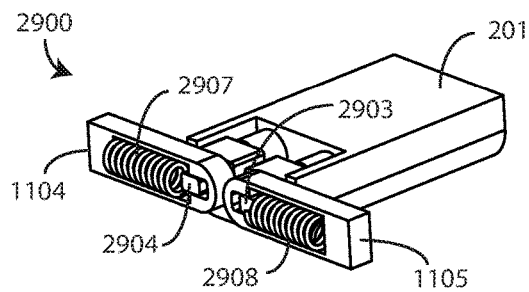
FIG. 43 illustrates the hinge of FIGS. 29-38 in the axially displaced open position.
Figure 44:
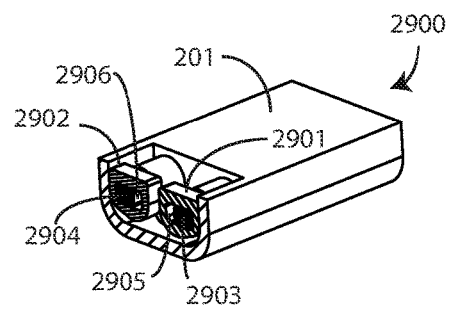
FIG. 44 illustrates a sectional view of the hinge of FIG. 43.

As shown in these figures, translation of the first post 2903 within the first aperture 2905 of the first cam 2901 from a first end of the first aperture 2905 that is positioned toward the end of the first hinge arm 1104 and positioned closest to the major wall of the hinge housing 201, as best seen in FIGS. 36 and 40, to a second end of the first aperture 2905 positioned toward the center of the first hinge arm 1104 and positioned closest to the minor wall of the hinge housing 201, as best seen in FIGS. 38 and 44, occurs in response to the asymmetry of the outer perimeter of the first cam 2901 changes the displacement of a first device housing (102) coupled to the first hinge arm 1104 and the hinge housing 201. Moreover, as shown in FIGS. 35 and 43, the asymmetry of the first cam 2901 also causes compression of the first spring 2907 when the first hinge arm 1104 and the second hinge arm 1105 pivot about the hinge housing 201 to the axially displaced open position. When the first hinge arm 1104 pivots relative to the device housing 102 back to the closed position shown in FIGS. 36 and 39, the first spring 2907 applies a loading force to the first post 2903, thereby causing it to travel back to the first end of the first aperture 2905 of the first cam 2901.

Similarly translation of the second post 2904 within the second aperture 2906 of the second cam 2902 from the first end of the second aperture 2906 that is positioned toward the end of the second hinge arm 1105 and positioned closest to the major wall of the hinge housing 201, as again best seen in FIGS. 36 and 40, to the second end of the second aperture 2906 positioned toward the center of the second hinge arm 1105 and positioned closest to the other minor wall of the hinge housing 201, as best seen in FIGS. 38 and 44, occurs in response to the asymmetry of the outer perimeter of the second cam 2902. This asymmetry changes the displacement of a second device housing (103) coupled to the second hinge arm 1105 and the hinge housing 201. Moreover, as shown in FIGS. 35 and 43, the asymmetry of the second cam 2902 also causes compression of the second spring 2908 when the second hinge arm 1105 pivots about the hinge housing 201 to the axially displaced open position. When the second hinge arm 1105 pivots relative to the device housing 102 back to the closed position shown in FIGS. 36 and 40, the second spring 2908 applies a loading force to the second post 2904, thereby causing it to travel back to the first end of the second aperture 2906 of the second cam 2902.

As shown in these figures, as the first cam 2901 and the second cam 2902 rotate within the U-shaped recess of the hinge housing 201, the arched rocker (2913) changes the position of the first post 2903 and the second post 2904 within the first aperture 2905 and the second aperture 2906, respectively, thereby altering the displacement between the first device housing (102) and the second device housing (103) as previously described. Rotation of the first hinge arm 1104 and the second hinge arm 1105 to the closed position compresses the first spring 2907 and the second spring 2908, respectively, as the arched rocker (2913) of each of the first cam 2901 and the second cam 2902 moves the corresponding post to the end of its respective aperture. Rotation of the first hinge arm 1104 and the second hinge arm 1105 to the closed position allows the springs to expand, thereby moving the corresponding post to the opposite end of its respective aperture. Accordingly, displacement is changed via the action of the outer perimeter shapes of the first cam 2901 and the second cam 2902 operating in tandem with the first spring 2907 and the second spring 2908.

Figure 45:
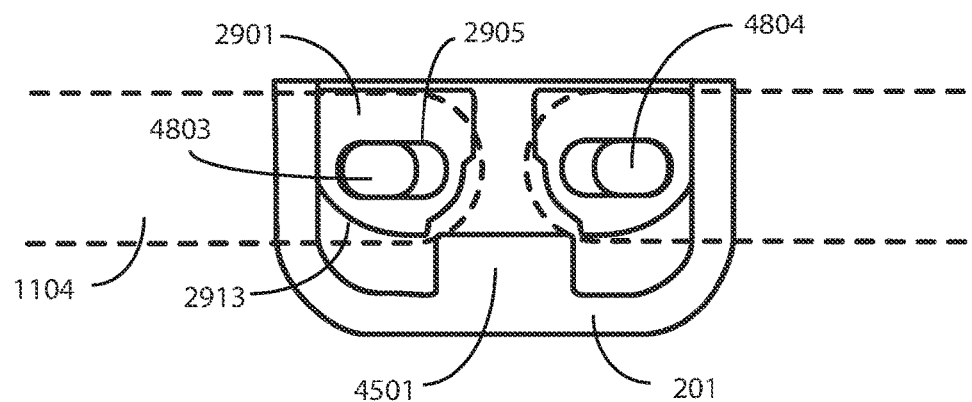
FIG. 45 illustrates yet another schematic block diagram of yet another hinge configured in accordance with one or more embodiments of the disclosure, with the hinge in the axially displaced open position.
Figure 46:
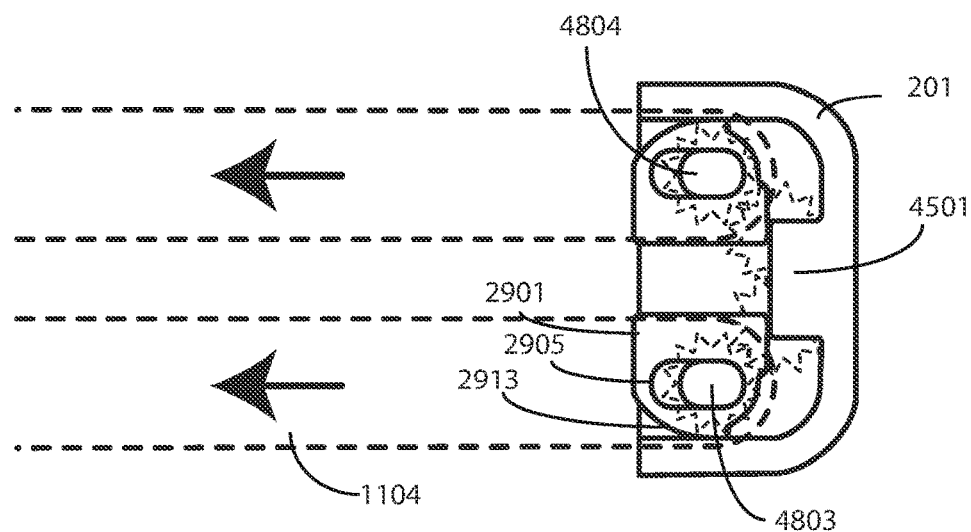
FIG. 46 illustrates yet another schematic block diagram of yet another hinge configured in accordance with one or more embodiments of the disclosure, with the hinge in the closed position.
Figure 47:
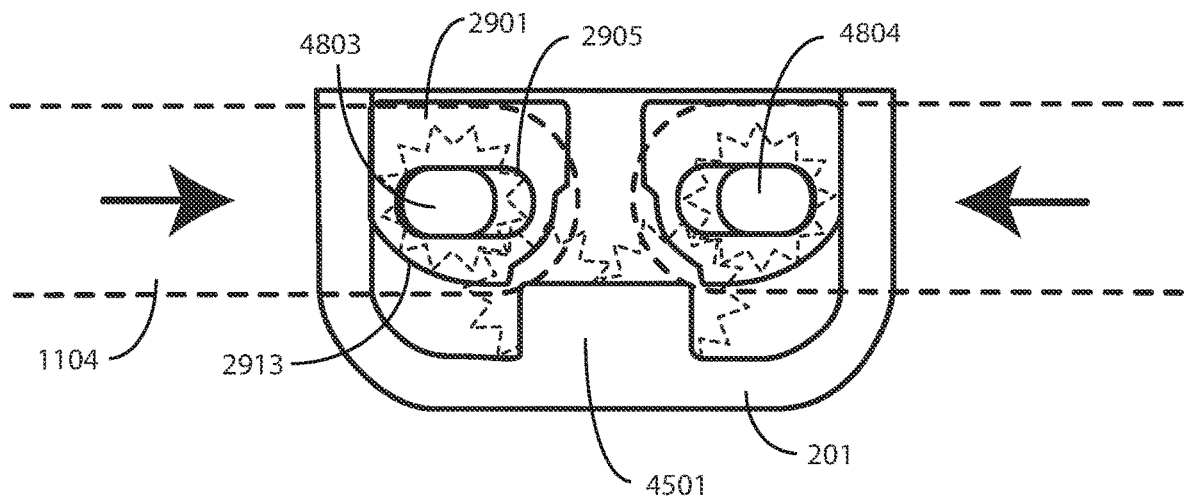
FIG. 47 illustrates a schematic block diagram of the hinge of FIG. 46 returning to the open position.

While the system of FIGS. 29-44 works well in practice, embodiments of the disclosure contemplate that the inclusion of the first spring 2907 and the second spring 2908 within openings of the first hinge arm 1104 and the second hinge arm 1105 can complicate assembly and increase manufacturing cost. Accordingly, turning now to FIGS. 45-47, illustrated therein is still another schematic block diagram illustrating yet another hinge mechanism that eliminates the need for the first spring (2907) and the second spring (2908). In the schematic block diagram of FIGS. 45-47, a closing cam 4501 is added to the interior of the hinge housing 201 to make the "reset" function of the first spring (2907) and the second spring (2908) occurring in FIGS. 33, 36, and 39-40 unnecessary.

In this illustrative embodiment, the cams of FIGS. 29-44 are again used (only one is shown in FIGS. 29-44 for simplicity). As before, when the first hinge arm 1104 pivots relative to the hinge housing 201, the arched rocker 2913 of the first cam 2901, with it's increasing thickness, causes the first post 4803 to translate within the first aperture 2905. However, when the first hinge arm 1104 moves to the closed position shown in FIG. 46, the inclusion of a closing cam 4501 abuts the intersection of the planar top 2909 and the first side 2910 of the first cam 2901, thereby pushing the first hinge arm 1104 away from the major interior surface of the hinge housing 201 where the closing cam 4501 is positioned. This causes the first post 4803 to move to the distal end of the first aperture 2905. A similar action occurs with reference to the second post 4804.

When the first hinge arm 1104 then pivots back to the axially displaced open position, the indent 2914 then abuts the closing cam 4501. As the thickness of the arched rocker 2913 against the minor interior wall of the hinge housing 2901 has decreased, the first post 4803 then moves back to the interior end of first aperture 2905. Advantageously, the inclusion of the closing cam 4501 eliminates the need for a spring-loaded reset when the first hinge arm 1104 is in the closed position.

Figure 48:
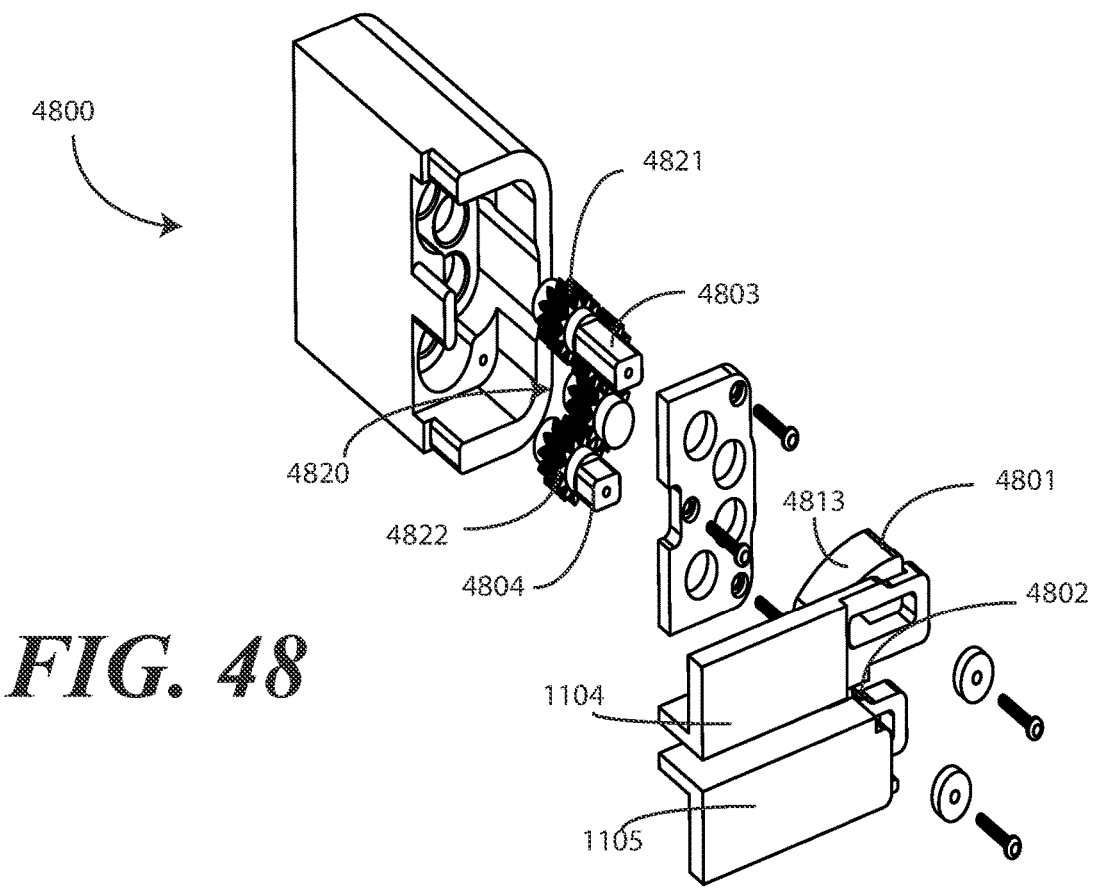
FIG. 48 illustrates an exploded view of still another hinge configured in accordance with one or more embodiments of the disclosure.

Turning now to FIG. 48, illustrated therein is an implementation of the schematic block diagram of FIGS. 45-47. The hinge assembly 4800 of FIG. 48 implements the features, functions, mechanics, and principles illustrated in the general block diagram schematics of FIGS. 45-47. The hinge assembly 4800 eliminates the need for pins translating in slots as discussed above with reference to FIGS. 13-15, and instead employs a unique asymmetrical perimeter of cams 4801,4802, which are variations of the first cam (2901) and second cam (2902) of FIGS. 29-30. As before, these cams 4801,4802 extend from the first hinge arm 1104 and the second hinge arm 1105, respectively.

As before, the first device housing (102) and second device housing (103) are not shown so that the elements of the hinge assembly 4800 can be more clearly seen. Additionally, as previously described the first hinge arm 1104 would be fixedly coupled to the first device housing (102). Similarly, the second hinge arm 1105 would be fixedly coupled to the second device housing 103. As the first hinge arm 1104 and the second hinge arm 1105 are pivotally coupled to the hinge housing 201, the first device housing (102) can pivot about the hinge housing 201 relative to the second device housing (103) between a closed position and an axially displaced open position. The components of FIG. 48 are shown in an exploded view for clarity. However, when the hinge assembly 4800 is assembled, as will be shown in FIGS. 49-68 below, the hinge housing 201 is pivotally coupled to the first hinge arm 1104 and the second device housing 103. Additionally, while the exact perimeter of the cams 4801,4802 is obscured in FIG. 48, their details, including their asymmetrical perimeter, will be readily shown in subsequent figures such as FIGS. 52, 55, 58, 61, 64, and 67.

As before, the hinge housing 201 is pivotally coupled to a first hinge arm 1104 and a second hinge arm 1105. Since a first device housing (102) would be coupled to the first hinge arm 1104, and since a second device housing (103) would be coupled to the second hinge arm 1105, the first device housing (102) would be pivotable about the hinge housing 201 relative to the second device housing (103) between an axially displaced open position and a closed position as previously described.

In this illustrative embodiment, the hinge assembly 4800 comprises a first post 4803 and a second post 4804. In one or more embodiments, a first cam 4801 extends distally from an end of the first hinge arm 1104 toward the hinge housing 201. Similarly, a second cam 4802 extends distally from an end of the second hinge arm 1105 toward the hinge housing 201.

In one or more embodiments, the hinge assembly 4800 can optionally include interlocking gears 4820 that situate against corresponding gears 4821,4822 positioned about the first post 4803 and the second post 4804. In one or more embodiments, the interlocking gears 4820 interlock with the gears 4821,4822 positioned about the first post 4803 and the second post 4804. When one of the first post 4803 or the second post 4804 rotates due to one device housing coupled to a hinge arm pivoting relative to the hinge housing 201, the interlocking gears 4820 ensure that the other of the first post 4803 or the second post 4804 also rotates, thereby creating symmetry of rotation between the first hinge arm 1104 and the second hinge arm 1105.

In one or more embodiments the interlocking gears 4820 comprise a first toothed wheel and a second toothed wheel that engage a gear 4821 defined by first toothed wheel positioned about the first post 4803 and another gear 4822 defined by a second toothed wheel positioned about the second post 4804. The engagement of the first toothed wheel and the second toothed wheel of the interlocking gears 4820 with the first toothed wheel and second toothed wheel of the first post 4803 and the second post 4804 causes a symmetric angular rotation of the first device housing (102) and the second device housing (103) when the first hinge arm 1104 and the second hinge arm 1105 each pivot about the hinge housing 201.

In one or more embodiments, the first post 4803 and the second post 4804 are generally rectangular in cross section. In this illustrative embodiment, the first post 4803 and the second post 4804 each have a chamfered rectangular cross section, which is a rectangular cross section where the corners have been chamfered to define a curved transition between minor and major faces rather than an angular one.

Turning briefly to FIG. 52, in one or more embodiments the first cam 4801 defines a first aperture 5201. Similarly, the second cam 4802 defines a second aperture 5202. In one or more embodiments, the first cam 4801 and the second cam 4802 each define generally rectangular apertures. In this illustrative embodiment, the first cam 4801 and the second cam 2902 each define a chamfered rectangular aperture, which again is a rectangular cross section where the corners have been chamfered to define a curved transition between minor and major faces rather than an angular one.

In one or more embodiments, the chamfered rectangular apertures of the first cam 4801 and the second cam 4802 each have a major axis (horizontal axis into the page as viewed in FIG. 52) that is greater in length than a corresponding major axis of the chamfered rectangular cross sections of the first post 4803 and the second post 4804. The minor axis, oriented orthogonally with this major axis, is shorter than the major axis. This difference in major axis lengths between that of the chamfered rectangular apertures of the first cam 4801 and the second cam 4802 compared to that of the first post 4803 and the second post 4804 allows the first post 4803 to translate within the first aperture 5201 of the first cam 4801 when the first hinge arm 1104 pivots about the hinge housing 201 between the axially displaced open position and the closed position. Similarly, the second post 4804 translates within the second aperture 5202 of the second cam 4802 when the second hinge arm 1105 pivots about the hinge housing 201 between the axially displaced open position and the closed position.

In one or more embodiments, this translation causes a change in the displacement between a first device housing (102) coupled to the first hinge arm 1104 and the hinge housing 201, and a second device housing (103) coupled to the second hinge arm 1105. As before, and as illustrated in FIGS. 51-68, in one or more embodiments the displacement is shorter when the first device housing (102) and the second device housing (103) are pivoted about the hinge housing 201 to the axially displaced open position than when the first device housing (102) and second device housing (103) are pivoted about the hinge housing 201 to the closed position.

Translation of the first post 4803 within the first aperture 5201 of the first cam 4801 and the second post 4804 within the second aperture 5202 of the second cam 4802 in the hinge assembly 4800 of FIGS. 48-68 occurs as a result of only two elements. These two elements include the shape of the outer perimeter of the first cam 4801 and the second cam 4802 and the shape of the interior surface of the hinge housing 201 into which the first cam 4801 and the second cam 4802 are situated. Unlike the embodiment of FIGS. 29-44, the action of a first spring (2907) and a second spring (2908) is unnecessary.

In one or more embodiments, the outer perimeter of the first cam 4801 and the second cam 4802 has a unique shape. In one or more embodiments, the first cam 4801 and the second cam 4802 each define an asymmetrical perimeter. In one or more embodiments this asymmetrical perimeter causes a translation of the first post 4803 and the second post 4804 in the first aperture 5201 and the second aperture 5202, respectively, as the first hinge arm 1104 (and accordingly a first device housing (102) coupled thereto) and the second hinge arm 1105 (and accordingly the second device housing (103) coupled thereto) pivot from the axially displaced open position to the closed position.

In this illustrative embodiment, the outer perimeter of each cam defines a planar top 5209. Situated atop the planar top 5209 is a closing follower 5203, which follows and abuts a closing cam 5204 when the first hinge arm 1104 and the second hinge arm 1105 are in the closed position of FIG. 52. The closing follower 5203 is shown abutting the closing cam 5204 in FIG. 52, but can be seen following the closing cam 5204 in FIGS. 57-58 and 60-61. As shown in those latter figures, the closing cam 5204 translates across interior portions of the first hinge arm 1104 and the second hinge arm 1105, namely, across portions of the closing follower 5203 of each of the first hinge arm 1104 and the second hinge arm 1105, respectively, as the first device housing (102) coupled to the first hinge arm 1104 and the second device housing (103) coupled to the second hinge arm 1105 pivot from the closed position to the axially displaced open position.

In one or more embodiments, each cam of the hinge arms then defines a first side 5210 oriented substantially orthogonally with the planar top 5209 by a chamfered corner. The first side 5210 extends distally from the planar top 5209 to a second side 5212, which extends distally away from the first side at an orthogonal angle. The second side then extends to a third side, oriented orthogonally therewith, and a fourth side, which also extends orthogonally therefrom to an arched rocker 5213 that wraps around the aperture of the cam with an increasingly greater thickness. The arched rocker 5213 then terminates at a bottom side of the hinge arm.

The interior surface of the hinge housing 201 into which the first cam 4801 and the second cam 4802 situate then defines a U-shaped recess. As the first cam 4801 and the second cam 4802 rotate within this U-shaped recess, the arched rocker 4813 changes the position of the first post 4803 and the second post 4804 within the first aperture 5201 and the second aperture 5202, respectively, thereby altering the displacement between the first device housing (102) and the second device housing (103) as previously described.

Turning now briefly to FIG. 53, this sectional view illustrates the gear assembly of the hinge assembly 4800. As noted above, in one or more embodiments the hinge assembly 4800 can optionally include interlocking gears 4820 that situate against corresponding gears 4821,4822 positioned about the first post 4803 and the second post 4804. As shown in FIG. 53 the interlocking gears 4820 include a first gear and a second gear. In one or more embodiments, the first gear rotationally engages the first post (4803) by engaging a third gear 4821 positioned about a perimeter of the first post (4803). In one or more embodiments, the second gear rotationally engages the second post (4804) by engaging a fourth gear 4822 positioned about a perimeter of the second post (4804).

Accordingly, the first gear rotationally engages the gear 4821 of the first post (4803) and the second gear. The second gear rotationally engages the gear 4822 of the second post and the first gear. As shown in the sectional views of the hinge assembly 4800 shown in FIGS. 53, 56, 59, 62, 65, and 68, when compared to the hinge assembly 4800 shown in the sectional views of FIGS. 52, 55, 58, 61, 64, and 67, rotation of the first gear and the second gear causes translation of the first hinge arm 1104 and the second hinge arm 1105 toward the hinge housing (201) as the first device housing (102) coupled to the first hinge arm 1104 and the second device housing (103) coupled to the second hinge arm 1105 pivot from the closed position to the axially displaced open position.

Figures 49, 50:
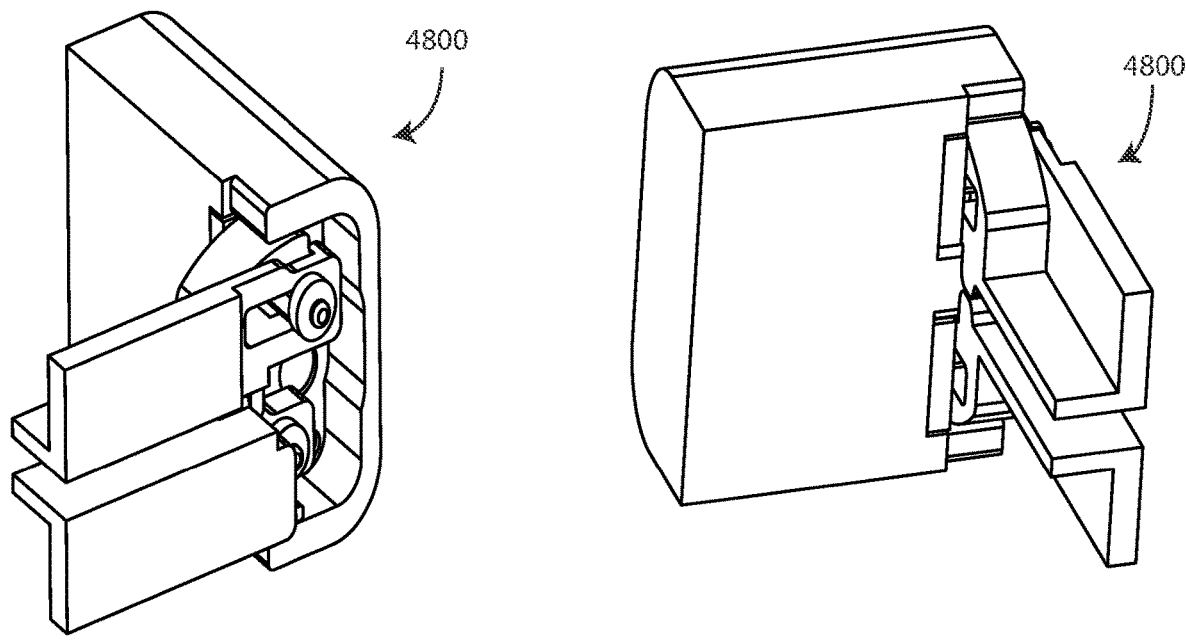
FIG. 49 illustrates an assembled view of still another hinge configured in accordance with one or more embodiments of the disclosure.
FIG. 50 illustrates another assembled view of still another hinge configured in accordance with one or more embodiments of the disclosure.

Turning now to FIGS. 49-50, the hinge assembly 4800 is shown in its assembled configuration. Turning next to FIGS. 51-68, the hinge assembly 4800 transitioning from the closed position to the axially displaced open position is shown, with FIGS. 52-53, 55-56, 61-62, 64-65, and 67-68 showing sectional views of the hinge assembly 4800 so the operation of the cams, gears, and hinge arms can be seen.

As shown in these figures, translation of the first post 4803 within the first aperture 5201 of the first cam 4801 from a first end of the first aperture 5201 that is positioned toward the end of the first hinge arm 1104 and positioned closest to the major wall of the hinge housing 201 to a second end of the first aperture 5201 positioned toward the center of the first hinge arm 1104 and positioned closest to the minor wall of the hinge housing 201 occurs in response to the asymmetry of the outer perimeter of the first cam 4801 changes the displacement of a first device housing (102) coupled to the first hinge arm 1104 and the hinge housing 201.

Similarly translation of the second post 4804 within the second aperture 5202 of the second cam 4802 from the first end of the second aperture 5202 that is positioned toward the end of the second hinge arm 1105 and positioned closest to the major wall of the hinge housing 201 to the second end of the second aperture 5202 positioned toward the center of the second hinge arm 1105 and positioned closest to the other minor wall of the hinge housing 201 occurs in response to the asymmetry of the outer perimeter of the second cam 4802. This asymmetry changes the displacement of a second device housing (103) coupled to the second hinge arm 1105 and the hinge housing 201.

As shown in these figures, as the first cam 4801 and the second cam 4802 rotate within the U-shaped recess of the hinge housing 201, the arched rocker 2913 changes the position of the first post 4803 and the second post 4804 within the first aperture 5201 and the second aperture 5202, respectively, thereby altering the displacement between the first device housing (102) and the second device housing (103) as previously described. Rotation of the first hinge arm 1104 and the second hinge arm 1105 to the closed position causes the closing follower 5203 of each hinge arm to translate across and engage the closing cam 5204.

As mentioned above, however, not all electronic devices configured in accordance with embodiments of the disclosure employ flexible displays. Accordingly, in other applications it may be desirous to use the hinge mechanisms described with reference to FIGS. 11-68 in an electronic device having rigid displays. One such example is shown in FIG. 69.

Figure 69:
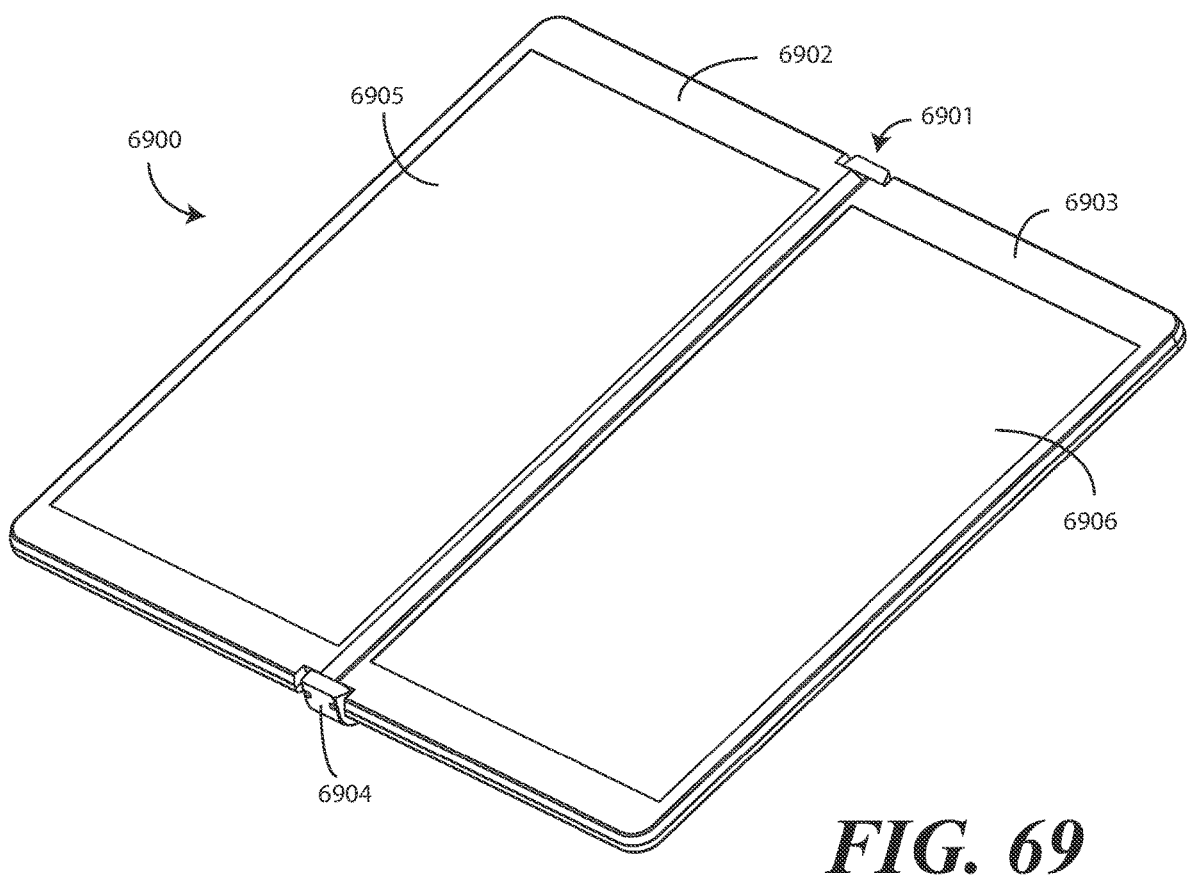
FIG. 69 illustrates an alternate electronic device configured in accordance with one or more embodiments of the disclosure.

Turning now to FIG. 69, illustrated therein is one embodiment where the flexible display and support plates are omitted. As shown in FIG. 69, an electronic device 6900 includes a first device housing 6902 and a second device housing 6903. A hinge 6901, which comprises a hinge body 6904, couples the first device housing 6902 to the second device housing 6903. The first device housing 6902 is pivotable about the hinge 6901 relative to the second device housing 6903 between an axially displaced open position and a closed position, as previously described.

Rather than having a flexible display, in this embodiment the electronic device 6900 includes a first display 6905 coupled to the first device housing 6902 and a second display 6906 coupled to the second device housing 6903. Thus, in addition to separating the first device housing 6902 from the second device housing 6903, the hinge 6901 separates the first display 6905 from the second display 6906 as well.

Figure 70:
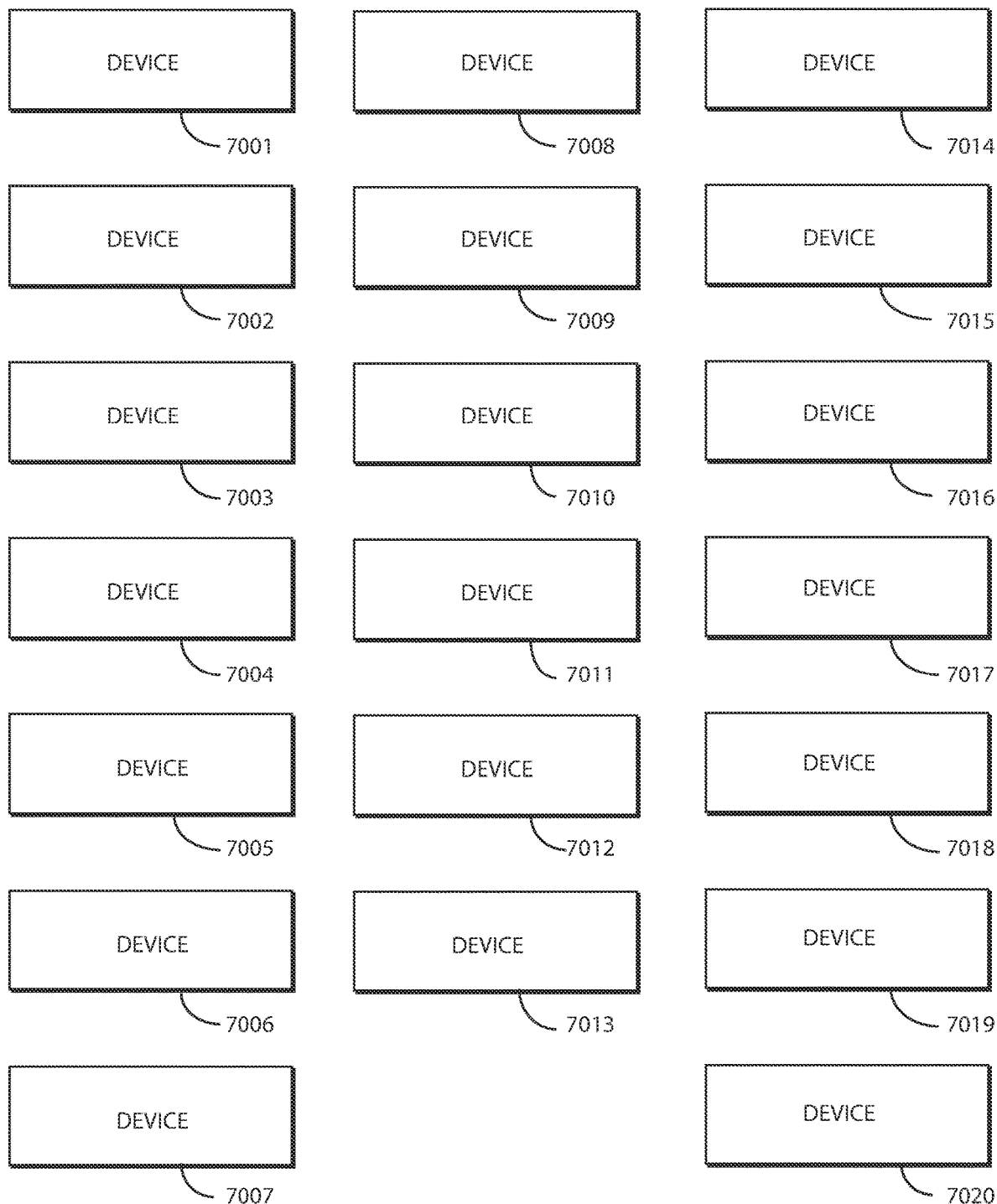
FIG. 70 illustrates various embodiments of the disclosure.

Turning now to FIG. 70, illustrated therein are various embodiments of the disclosure. The embodiments of FIG. 70 are shown as labeled boxes in FIG. 70 due to the fact that the individual components of these embodiments have been illustrated in detail in FIGS. 1-69, which precede FIG. 70. Accordingly, since these items have previously been illustrated and described, their repeated illustration is no longer essential for a proper understanding of these embodiments. Thus, the embodiments are shown as labeled boxes.

At 7001, an electronic device comprises a first device housing and a second device housing. At 7001, the electronic device comprises a hinge housing coupled to a first hinge arm coupled to the first device housing and a second hinge arm coupled to the second device housing such that the first device housing is pivotable about the hinge housing relative to the second device housing between an axially displaced open position and a closed position.

At 7001, a first pin translates within a first slot of the first hinge arm and a second pin translates within a second slot of the second hinge arm, respectively, when the first device housing and the second device housing pivot about the hinge housing between the axially displaced open position and the closed position, thereby changing a displacement between the hinge housing and the first device housing and second device housing. At 7002, the displacement of 7001 is shorter when the first device housing and the second device housing are pivoted about the hinge housing to the axially displaced open position than when the first device housing and second device housing are pivoted about the hinge housing to the closed position.

At 7003, the electronic device of 7002 further comprises a first spring-loaded link coupled between the hinge housing and the first hinge arm and a second spring-loaded link coupled between the hinge housing and the second hinge arm. At 7004, the first spring-loaded link and the second spring-loaded link of 7003 biasing the first hinge arm and the second hinge arm, respectively, toward the hinge housing as the first device housing and the second device housing pivot from the closed position to the axially displaced open position.

At 7005, the first slot and the second slot of 7002 each define a detent at an end of the first slot and the second slot located distally from the hinge housing. At 7006, the detent of the first slot and the second slot of 7005 retain the first pin and the second pin, respectively, therein when the first device housing and the second device housing pivot to the closed position. At 7007, the first slot and the second slot of 7006 each define arcuate slot apertures.

At 7008, an electronic device comprises a first device housing and a second device housing. At 7008, the electronic device comprises a hinge housing coupled to a first hinge arm coupled to the first device housing and a second hinge arm coupled to the second device housing such that the first device housing is pivotable about the hinge housing relative to the second device housing between an axially displaced open position and a closed position.

At 7008, the electronic device comprises a first post translating within a first aperture of a first cam and a second post translating within second aperture of a second cam, respectively, when the first device housing and the second device housing pivot about the hinge housing between the axially displaced open position and the closed position, thereby changing a displacement between the hinge housing and the first device housing and second device housing. At 7009, the displacement of 7008 is shorter when the first device housing and the second device housing are pivoted about the hinge housing to the axially displaced open position than when the first device housing and second device housing are pivoted about the hinge housing to the closed position.

At 7010, the first post and the second post of 7009 each have a chamfered rectangular cross section. At 7010, the first aperture and the second aperture define chamfered rectangular apertures having a major axis greater than the chamfered rectangular cross section. At 7011, a minor axis of the chamfered rectangular apertures of 7010 is shorter than the major axis.

At 7012, the electronic device of 7010 further comprises a first spring and a second spring biasing the first hinge arm and the second hinge arm, respectively, toward the hinge housing as the first device housing and the second device housing pivot from the closed position to the axially displaced open position. At 7013, each of the first cam and the second cam of 7012 define an asymmetrical perimeter causing a preloading of the first spring and the second spring, respectively, when the first device housing and the second device housing pivot from the axially displaced open position to the closed position.

At 7014, an electronic device comprises a first device housing and a second device housing. At 7014, the electronic device comprises a hinge housing coupled to a first hinge arm coupled to the first device housing and a second hinge arm coupled to the second device housing such that the first device housing is pivotable about the hinge housing relative to the second device housing between an axially displaced open position and a closed position. At 7014, the hinge housing comprises a first post and a second post that is rotationally linked to the first post At 7014, the first post translates within a first aperture of a first cam and the second post translates within second aperture of a second cam, respectively, when the first device housing and the second device housing pivot about the hinge housing between the axially displaced open position and the closed position, thereby changing a displacement between the hinge housing and the first device housing and second device housing. At 7015, the displacement of 7014 is shorter when the first device housing and the second device housing are pivoted about the hinge housing to the axially displaced open position than when the first device housing and second device housing are pivoted about the hinge housing to the closed position.

At 7016, the first post and the second post of 7015 each have a chamfered rectangular cross section. At 7016, the first aperture and the second aperture define chamfered rectangular apertures having a major axis greater than the chamfered rectangular cross section. At 7017, the minor axis of the chamfered rectangular apertures of 7016 is shorter than the major axis.

At 7018, the electronic device of 7016 further comprises a first gear rotationally engaging the first post and a second gear, with the second gear rotationally engaging the second post and the first gear, with rotation of the first gear and the second gear causing translation of the first hinge arm and the second hinge arm toward the hinge housing as the first device housing and the second device housing pivot from the closed position to the axially displaced open position.

At 7019, the electronic device of 7018 further comprises a third gear positioned about a perimeter of the first post and rotationally engaging the first gear, and a fourth gear positioned about a perimeter of the second post and engaging the second gear. At 7020, the hinge housing of 7019 comprises a closing cam translating across interior portions of a closing follower of the first hinge arm and the second hinge arm, respectively, as the first device housing and the second device housing begin to pivot from the closed position toward the axially displaced open position.

In the foregoing specification, specific embodiments of the present disclosure have been described. However, one of ordinary skill in the art appreciates that various modifications and changes can be made without departing from the scope of the present disclosure as set forth in the claims below. Thus, while preferred embodiments of the disclosure have been illustrated and described, it is clear that the disclosure is not so limited. Numerous modifications, changes, variations, substitutions, and equivalents will occur to those skilled in the art without departing from the spirit and scope of the present disclosure as defined by the following claims. Accordingly, the specification and figures are to be regarded in an illustrative rather than a restrictive sense, and all such modifications are intended to be included within the scope of present disclosure. The benefits, advantages, solutions to problems, and any element(s) that may cause any benefit, advantage, or solution to occur or become more pronounced are not to be construed as a critical, required, or essential features or elements of any or all the claims.

What is claimed is:

1. An electronic device, comprising:
  a first device housing and a second device housing;
  a hinge housing coupled to a first hinge arm coupled to the first device housing and a second hinge arm coupled to the second device housing such that the first device housing is pivotable about the hinge housing relative to the second device housing between an axially displaced open position and a closed position; and
  a first pin translating within a first slot of the first hinge arm and a second pin translating within a second slot of the second hinge arm, respectively, when the first device housing and the second device housing pivot about the hinge housing between the axially displaced open position and the closed position, thereby changing a displacement between the hinge housing and the first device housing and second device housing.

2. The electronic device of claim 1, wherein the displacement is shorter when the first device housing and the second device housing are pivoted about the hinge housing to the axially displaced open position than when the first device housing and second device housing are pivoted about the hinge housing to the closed position.

3. The electronic device of claim 2, further comprising a first spring-loaded link coupled between the hinge housing and the first hinge arm and a second spring-loaded link coupled between the hinge housing and the second hinge arm.

4. The electronic device of claim 3, the first spring-loaded link and the second spring-loaded link biasing the first hinge arm and the second hinge arm, respectively, toward the hinge housing as the first device housing and the second device housing pivot from the closed position to the axially displaced open position.

5. The electronic device of claim 2, wherein the first slot and the second slot each define a detent at an end of the first slot and the second slot located distally from the hinge housing.

6. The electronic device of claim 5, the detent of the first slot and the second slot retaining the first pin and the second pin, respectively, therein when the first device housing and the second device housing pivot to the closed position.

7. The electronic device of claim 6, wherein the first slot and the second slot define arcuate slot apertures.

8. The electronic device of claim 4, the first spring-loaded link positioned between the hinge housing and the first hinge arm and the second spring-loaded link positioned between the hinge housing and the second hinge arm.

9. The electronic device of claim 8, the first spring-loaded link and the second spring-loaded link each comprising a base member defining an aperture and a shaft.

10. The electronic device of claim 9, further comprising a first spring positioned along the shaft of the first spring-loaded link and a second spring positioned along the shaft of the second spring-loaded link.

11. The electronic device of claim 10, the first hinge arm and the second hinge arm each comprising a mechanical stop extending distally from an interior of the first hinge arm and the second hinge arm respectively.

12. The electronic device of claim 11, the first spring positioned between the base member of the first spring-loaded link and the mechanical stop of the first hinge arm and the second spring positioned between the base member of the second spring-loaded link and the mechanical stop of the second hinge arm.

13. The electronic device of claim 11, the mechanical stop extending distally from an interior of the first hinge arm and the second hinge arm, respectively, at an orthogonal angle.

14. The electronic device of claim 8, further comprising a component positioned between both the first spring-loaded link and the first hinge arm and the second spring-loaded link and the second hinge arm, the first pin and the second pin extending distally from the component.

15. The electronic device of claim 14, the hinge housing defining a first axle and a second axle extending distally therefrom, the first spring-loaded link and the second spring-loaded link each comprising a base member defining an aperture and a shaft, the first axle passing through the aperture of the base member of the first spring-loaded link and the second axle passing through the aperture of the base member of the second spring-loaded link.

16. The electronic device of claim 15, the component defining a third aperture and a fourth aperture, the first axle passing through the third aperture and the second axle passing through the fourth aperture.

17. The electronic device of claim 16, further comprising a first spring positioned along the shaft of the first spring-loaded link and a second spring positioned along the shaft of the second spring-loaded link.

18. The electronic device of claim 17, the first hinge arm and the second hinge arm each comprising a mechanical stop extending distally from an interior of the first hinge arm and the second hinge arm respectively, the first spring positioned between the base member of the first spring-loaded link and the mechanical stop of the first hinge arm and the second spring positioned between the base member of the second spring-loaded link and the mechanical stop of the second hinge arm.

19. The electronic device of claim 18, the first hinge arm fixedly coupled to the first device housing, the second hinge arm fixedly coupled to the second device housing.

20. The electronic device of claim 19, further comprising a component positioned between the first spring-loaded link and the first hinge arm and between the second spring-loaded link and the second hinge arm, the component defining a partition that situates between the first spring-loaded link and the second spring-loaded link.

* * * * *